US012719771B2

(12) United States Patent
Sinha

(10) Patent No.: US 12,719,771 B2
(45) Date of Patent: Aug. 25, 2026

(54) SYSTEMS AND METHODS FOR PROFILING LOW LATENCY APPLICATIONS USING TELEMETRY

(71) Applicant: Avago Technologies International Sales Pte. Limited, Singapore (SG)

(72) Inventor: Santanu Sinha, Cupertino, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/645,763

(22) Filed: Apr. 25, 2024

(65) Prior Publication Data

US 2025/0193096 A1 Jun. 12, 2025

Related U.S. Application Data

(60) Provisional application No. 63/607,396, filed on Dec. 7, 2023.

(51) Int. Cl.
*H04L 43/062* (2022.01)
*H04L 43/067* (2022.01)
*H04L 47/22* (2022.01)

(52) U.S. Cl.
CPC .......... *H04L 43/062* (2013.01); *H04L 43/067* (2013.01); *H04L 47/22* (2013.01)

(58) Field of Classification Search
CPC ..... H04L 43/062; H04L 43/067; H04L 47/22; H04L 47/2475; H04L 63/1408; H04L 43/0888; H04L 43/0894
See application file for complete search history.

(56) References Cited

U.S. PATENT DOCUMENTS 7,895,397 B2 * 2/2011 Tetrick ................ G06F 12/0888 711/138
8,031,599 B2 * 10/2011 Duffield ................ H04L 41/142 370/230.1
8,111,629 B2 * 2/2012 Oron ....................... H04L 47/41 709/228
8,146,133 B2 * 3/2012 Moon ................ H04L 67/1085 726/16

(Continued)

OTHER PUBLICATIONS

T. Nguyen, G. Armitage, A Survey of Techniques for Internet Traffic Classification using Machine Learning, 2008 IEEE, vol. 10, No. 4, Fourth Quarter 2008, p. 56-76 (Year: 2008).*

*Primary Examiner* — Alex Tran
(74) *Attorney, Agent, or Firm* — Foley & Lardner LLP

(57) ABSTRACT

Described embodiments provide systems and methods for profiling low latency applications using telemetry. A data processing system can include one or more processors and memory. The data processing system can receive telemetry data for a plurality of flows of packets. The data processing system can determine, using the telemetry data, a variance of bandwidth, a variance of packet lengths, and a variance of inter-arrival times between packets for each of the flows of packets. The data processing system can determine a type of application for a flow of the flows of packets based at least on a signature of the variance of bandwidth, the variance of packet lengths, and the variance of inter-arrival times for the flow. The data processing system can take, in response to determining the type of application, one or more actions to provide a quality of service for the flow according to the type of application.

15 Claims, 13 Drawing Sheets

(56) References Cited

U.S. PATENT DOCUMENTS

| | | | | |
|---|---|---|---|---|
| 8,180,916 | B1 * | 5/2012 | Nucci | H04L 43/028 709/224 |
| 11,509,539 | B2 * | 11/2022 | Iwai | H04L 1/002 |
| 11,552,867 | B1 * | 1/2023 | Vega | G06F 18/2431 |
| 11,979,328 | B1 * | 5/2024 | Zhang | G06N 3/04 |
| 12,206,587 | B2 * | 1/2025 | Sreevalsan | H04L 47/2441 |
| 2010/0034102 | A1 * | 2/2010 | Wang | H04L 41/0893 370/252 |
| 2012/0317306 | A1 * | 12/2012 | Radinsky | H04L 63/1408 709/235 |
| 2017/0317883 | A1 * | 11/2017 | Steiner | H04L 12/4015 |
| 2023/0164043 | A1 * | 5/2023 | Sirov | H04L 41/5032 709/224 |
| 2024/0114367 | A1 * | 4/2024 | Kazmi | H04W 24/04 |
| 2024/0172259 | A1 * | 5/2024 | Sevin | H04W 72/12 |

* cited by examiner

400

SYSTEMS AND METHODS FOR PROFILING LOW LATENCY APPLICATIONS USING TELEMETRY

CROSS-REFERENCE TO RELATED APPLICATION

This application claims the benefit of and priority to U.S. Provisional Patent Application No. 63/607,396, filed on Dec. 7, 2023, the disclosure of which is hereby incorporated by reference in its entirety.

FIELD OF THE DISCLOSURE

This disclosure generally relates to systems for and methods of communication, including but not limited to, communications associated with internet service provider (ISP) networks, cable modems, gigabit passive optical network (GPON) devices, set-top boxes, televisions, user devices, Ethernet network devices, and/or wireless devices. Some embodiments in the disclosure relate to profiling low latency applications using telemetry for such communications and/or control of devices and networks for low latency operations.

BACKGROUND

Latency issues in communications between a home network and an ISP can lead to various challenges and disruptions in internet connectivity and user experience, especially for evolving low latency usages including but not limited to video conferencing, cloud gaming, augmented reality/virtual reality (ARNR) applications, and metaverse applications.

ISPs are companies that provide internet access to individuals and businesses. ISPs generally own, lease and manage a network infrastructure that connects users to the internet. This infrastructure can include various components such as data centers, routers, switches, coaxial cables, and fiber optic cables. ISPs obtain internet connectivity from larger networks, such as backbone providers or internet exchange points (IXPs), and distribute communication services to their customers.

Latency can be associated with one or more parties (e.g., cloud providers, ISPs, application developers and silicon vendors) and one or more devices and networks, including but not limited to ISP networks, cables modems, GPON devices, set top boxes, WiFi networks, Ethernet networks, access networks, backbone networks, and cloud infrastructure. To support internet speeds, ISPs are using larger burst data communications which often require larger buffers at each node. Larger bursts/buffers can increase communication latencies.

Latency can be manifested as slow response times (e.g., when loading web pages, streaming videos, or downloading files), decreased quality of real-time applications (e.g., low latency applications that rely on real-time communication, such as video conferencing, voice over IP (VoIP) calls, and online gaming), buffering and interruptions in streaming, unstable connections, adverse impact on cloud-based services (e.g., file storage, email, and productivity tools, affecting productivity and efficiency), increased vulnerability to cyberattacks, and limited capacity for interactive applications (e.g., limit the effectiveness of interactive applications that require real-time user input, such as online collaborative tools, virtual classrooms, and remote desktop applications). High latency can result in choppy video/audio playback, laggy conversations, and delayed reactions in online games, leading to a poor user experience and communication difficulties. High latency can result in data packets arriving out of order or being delayed, leading to pauses in playback and degraded streaming quality. High latency can provide attackers with more time to exploit security vulnerabilities and launch malicious attacks, such as distributed denial-of-service (DDoS) attacks or man-in-the-middle (MitM) attacks.

SUMMARY

This Summary is provided to introduce a selection of concepts in a simplified form that are further described below in the Detailed Description. This Summary is not intended to identify key features or essential features, nor is it intended to limit the scope of the claims included herewith.

In certain communication systems, various devices can be interconnected or communicatively coupled with each other to perform the transmission, reception, or exchange of data via a network. Individual devices can include or be installed with at least one (network) application executable by the respective device. The applications can allow for or facilitate the exchange of data between the various devices within the network, including the transmission or reception of flows of data packets. Different types of applications may be utilized, encompassing a broad spectrum of functionalities, ranging from basic data exchange to latency-sensitive audio and video streams, among others. Such latency-sensitive applications can be referred to as low latency applications or real time applications. The low latency applications can be designed to operate with relatively short response times, ensuring near-instantaneous communication and interaction between users or devices, e.g., for video or audio streaming, online gaming, teleconferencing, virtual reality simulations, etc.

In some aspects, low end-to-end latency can be configured or provided for an application (e.g., low latency application) when the various network devices or equipment in the communication path of the application traffic flows can provide or support low latency service. However, it may be difficult to identify whether the data flow is from a low latency application (as opposed to a non-low latency application or non-real-time application) to provide the low latency service. For example, within the intricate network infrastructure, each device may execute different applications with varying latency requirements. While some applications may tolerate relatively higher latency, others demand near-instantaneous response times to maintain seamless user experiences. Given the varying types of applications, the available packet header fields of data packets (e.g., as part of at least one data flow) may lack identifiable or reliable information regarding the applications or the priority levels of the applications. Consequently, network nodes may struggle to accurately identify or classify low latency applications using the packet header information to provide the low latency service.

Further, it may be challenging to determine whether certain devices or equipment support low latency service (e.g., latency-sensitive data flows). For instance, some network equipment may be owned or managed by a client and may not be managed by a network operator. In some cases, the network operator may not have information regarding the client-owned or managed network equipment, e.g., to determine whether the network equipment can provide low latency service. Such network equipment may lack support for resource reservation for latency-sensitive data flows (e.g., audio or video flows). Hence, the systems and methods of the technical solution can provide features and operations discussed herein to profile, identify, or detect low latency applications using telemetry information from data flows.

The systems and methods of this technical solution can perform flow analysis using collected real-time telemetry information. For example, the system can collect telemetry information for individual data flow. Each data flow can be identified or defined by at least a 5-tuple included in the data packets of the data flow. The system can perform a look-up in a database to determine whether an entry (e.g., the 5-tuple) associated with the flow exists in the database. The system can update a counter associated with an existing flow or learn and add a new flow in the database based on whether the flow exists in the database. The system can update the counter of the existing flow to determine or generate the telemetry data for the flow, such as but not limited to the bandwidth, average packet length, or average inter-arrival time of the packets for the flow. The system can periodically compute one or more variances using the telemetry data to profile the flow, among other flows, e.g., determine whether the flows are latency-sensitive or non-latency-sensitive (or latency-insensitive). According to the profiled flow, the system can determine whether the application associated with the respective flow is a low latency application or other types of applications (e.g., non-low latency application). In response to determining that the application is a low latency application, the system can execute or take one or more actions discussed herein based on the type of application to ensure the quality of server (QoS) and prevent packet loss for the profiled flow.

In one aspect, the present disclosure is directed to a method for profiling low latency applications using telemetry. The method can include receiving, by a data processing system comprising one or more processors and memory, telemetry data for a plurality of flows of packets. The method can include determining, by the data processing system using the telemetry data, a variance of bandwidth, a variance of packet lengths, and a variance of inter-arrival times between packets for each of the plurality of flows of packets. The method can include determining, by the data processing system, a type of application for a flow of the plurality of flows of packets based at least on a signature of the variance of bandwidth, the variance of packet lengths, and the variance of inter-arrival times for the flow. The method can include taking, by the data processing system in response to determining the type of application, one or more actions to provide a quality of service for the flow according to the type of application.

The method can include determining, by the data processing system, the type of application is one of a low latency application or a real-time application. The method can include receiving, by the data processing system, the telemetry data on a periodic basis. The method can include determining, by the data processing system on the periodic basis, the variance of bandwidth, the variance of packet lengths, and the variance of inter-arrival times between packets for each of the plurality of flows of packets. The method can include tracking, by the data processing system, changes in the variance of bandwidth, the variance of packet lengths, and the variance of inter-arrival times over time.

The method can include determining, by the data processing system, the type of application for the flow of the plurality of flows of packets based on the variance of bandwidth, the variance of packet lengths, and the variance of inter-arrival times for the flow being within a threshold. The method can include determining, by the data processing system, the type of application for the flow of the plurality of flows of packets based at least on an average of each of bandwidth, packet lengths, and inter-arrival times.

The method can include determining, by the data processing system, the signature for the type of application as a function of the variance of bandwidth, the variance of packet lengths, and the variance of inter-arrival times. Taking the one or more actions can include one or more of: assigning, by the data processing system, the flow to a link in a link-aggregation as a destination port; assigning, by the data processing system, the flow to a higher traffic class; storing, by the data processing system, packets from the flow to one or more higher priority queues; using, by the data processing system, a network traffic shaper to reduce burstiness; and using, by the data processing system, traffic management or buffer policies for one or more other flows. The type of application can include separate flows for each of voice, video, management, control, and data.

In one aspect, this disclosure provides a system for profiling low latency applications using telemetry. The system can include a data processing system comprising one or more processors and memory. The data processing system can determine, using telemetry data received for a plurality of flows of packets, a variance of inter-arrival times between packets for each of the plurality of flows of packets. The data processing system can determine a type of application for a flow of the plurality of flows of packets based at least on the variance of inter-arrival times for the flow. The data processing system can take, in response to determining the type of application, one or more actions to provide a quality of service for the flow according to the type of application.

The data processing system can determine, using the telemetry data, a variance of packet lengths for each of the plurality of flows of packets and the type of application for the flow based at least on the variance of inter-arrival times and the variance of packet lengths for the flow. The data processing system can determine, using the telemetry data, a variance of bandwidth for each of the plurality of flows of packets and the type of application for the flow based at least on the variance of inter-arrival times and the variance of bandwidth for the flow.

The data processing system can determine the type of application for the flow of the plurality of flows of packets based on a signature comprising a function of a variance of bandwidth, a variance of packet lengths, and the variance of inter-arrival times for the flow being within a threshold. The data processing system can determine the type of application for the flow of the plurality of flows of packets based at least on an average of inter-arrival times.

The data processing system can take, responsive to the type of application, the one or more actions comprising one or more of: assigning the flow a link in a link-aggregation as a destination port; assigning the flow to a higher traffic class; storing packets from the flow to one or more higher priority queues; using a network traffic shaper to reduce burstiness; and using traffic management or buffer policies for one or more other flows.

In another aspect, this disclosure is directed to a system for profiling low latency applications using telemetry. The system can include a network device intermediary to a plurality of devices communicating, via the network device, a plurality of flows of packets for one or more applications. The network device can determine, using telemetry data for the plurality of flows of packets, a variance of inter-arrival times between packets for each of the plurality of flows of packets. The network device can determine a type of application for a flow of the plurality of flows of packets is a low latency application based at least on the variance of inter-arrival times for the flow. The network device can take, in response to determining the type of application, one or more actions to provide a quality of service for the flow according to the type of application.

The network device can include a switch. The network device can determine the type of application for the flow of the plurality of flows of packets is the low latency application based at least on the variance of inter-arrival times and variance of bandwidth for the flow. The network device can determine the type of application for the flow of the plurality of flows of packets is the low latency application based at least on the variance of inter-arrival times and variance of packet lengths for the flow.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
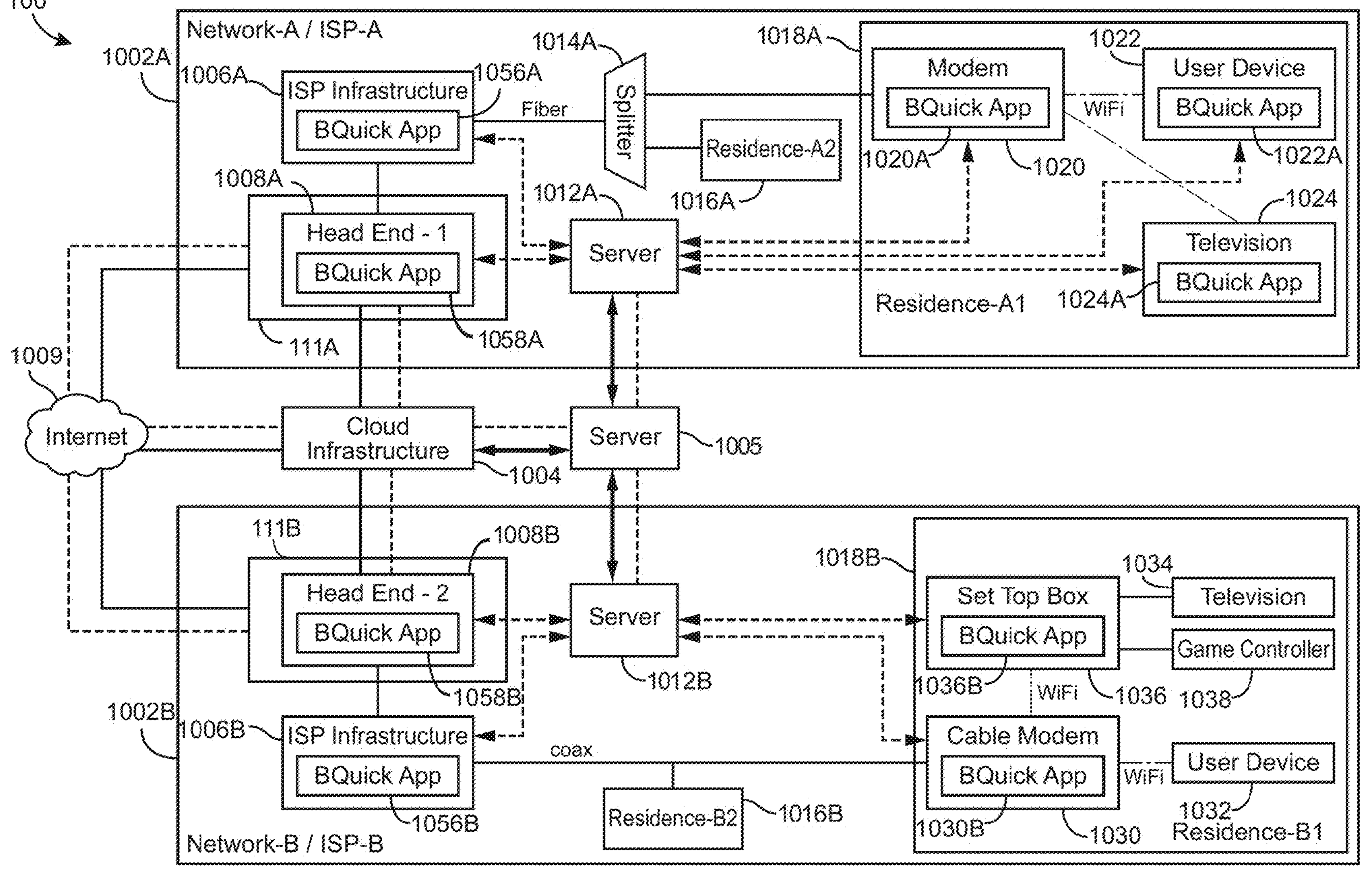
FIG. 1A is a general schematic block diagram of a communication system, in accordance with one or more embodiments.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature in communication with or communicatively coupled to a second feature in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

The following IEEE standard(s), including any draft versions of such standard(s), are hereby incorporated herein by reference in their entirety and are made part of the present disclosure for all purposes: IEEE 802.11™, IEEE 802.14™, IEEE P802.3™ and IEEE Ethernet standard systems including but not limited to LRM, VSR, SR, MR, LR, ZR and KR. Although this disclosure may reference aspects of these standard(s), the disclosure is in no way limited by these standard(s).

Devices provided by ISPs and customer-owned ARNR setups, mobile phones, OTT devices, and cloud gaming clients are configured for low latency uses in some embodiments. Some embodiments of systems and methods disclosed herein provide a real time or near real time system to monitor end to end latencies. In some applications, timestamp synchronization with applications at intermediate nodes and end devices use precision time protocol (PTP) synchronization protocols for latency monitoring. In some embodiments, latency is monitored from end-to-end so that latency of all devices within the entire end-to-end process is considered, thereby enabling identification of the origins of substantial latency.

In some embodiments, the systems and methods achieve synchronization of the wall clock across all nodes and end-user devices by employing timestamps for low latency data packets at each node. The determination of latency at each node is made by applications at each node. The determination of latency is reported back to a server that communicates with the applications. The systems and methods allow the communication system to distinguish whether latency arises from the home network, an ISP, or cloud servers.

A latency application server extension is integrated into the ISP-provided modem or router in some embodiments. In some embodiments, the server extensions have the ability to filter and transmit all necessary information to the ISP's cloud server or share open data with application developers. The server extension can store or receive information about a customer's low latency plan subscription and can track low latency usages inside the home in some embodiments.

A server extension can refer to a software component or module that extends the functionality of a server application (e.g., a latency application) in some embodiments. Server extensions can be used in various server environments such as web servers, application servers, ISP servers, and database servers to enhance their capabilities or to add specific features tailored to the needs of users or applications and can be installed using extension files. The extensions can be installed on any of the devices discussed herein. In some embodiments, the extensions are provided on an ISP controlled server in the cloud, an ISP controlled modem or access point, a third party WiFi access point, a third party modem, or ISP provided low latency devices.

In some embodiments, the server extension allows a user to select device applications for different latency treatment. A server within the residence can use classifiers and queues to reduce latency for low latency devices. The server can be part of a router, set top box, hub, etc. in some embodiments. The server extensions support multiparty involvement (e.g., cloud managers, ISPs, application developers and silicon vendors) for end to end usages in some embodiments.

With respect to latency, generally, latency refers to an amount of time a system, application or device takes to process and respond to a request in some embodiments. With respect to low latency, low latency refers to such amount of time being within a threshold, a performance level, a user experience level or requirements of the application or usage in some embodiments. The threshold, performance level, user experience level or requirements of the application may vary based on context, such as a type of application and/or use case and the systems, networks, and computer environment for which such use cases and/or application operate or execute. Low latency from a perspective of a computing environment refers to an ability of a computing system or network to provide responses without unacceptable or unsuitable delay, or otherwise minimal delay, for the context or use case of which such responses are provided. System criteria and application parameters can affect a threshold for low latency. The threshold can be fixed or variable (e.g., depending upon conditions or actual needs or requirements at a particular time). With respect to low latency networks and systems in a context of network and network communication, low latency describes a computer network, systems and environment that is designed, configured and/or implemented to support applications, network traffic and processing operations to reduce, improve latency or to meet a low latency threshold. End-to-end latency refers to latency between two points in a network or communication system. The two points can be a source of data and a consumer of data, or intermediate points therebetween in some embodiments.

A low latency device refers to any hardware, device component, or system that has low latency considerations or requirements in some embodiments. A low latency device can be a telecommunications, remote control systems, gaming, audio processing, financial trading, augmented reality and/or virtual reality device where delays can impact user experience or system performance. There may be levels of low latency requirements where one low latency device has a more stringent requirement than another low latency device in some embodiments. A low latency path refers to a path for low latency operation in some embodiments. Latency data refers to any indication of latency associated with a communication or configuration data for low latency operation or control in some embodiments. A low latency application refers to the use or performance of a low latency operation in some embodiments. A low latency device or software program can be used to perform the low latency operation (video conferencing, cloud gaming, augmented reality/virtual reality (ARNR) applications, and metaverse applications).

Some embodiments relate to a system including a first device and an application. The application operates on the first device and is configured to append time stamps to a first packet received by the first device. The time stamps indicate a first time the first packet is received by the first device and a second time the first packet is sent by the first device. Append refers to adding or attaching information to a data structure (e.g., a packet) in some embodiments.

In some embodiments, the application is configured to determine latency information associated with communication through the first device using the time stamps. The time stamps include a first time stamp for the first time and a second time stamp for the second time. In some embodiments, the application is configured to provide a second packet including the latency information and communicate the second packet to a server remote from the first device via a virtual communication link. In some embodiments, the first time stamp is an ingress time stamp and the second time stamp is an egress time stamp.

In some embodiments, the time stamps are provided as part of a precision time protocol. In some embodiments, the first packet is for use in a low latency operation. In some embodiments, the time stamps are derived from a satellite time source. In some embodiments, the latency information includes a history of time stamps. In some embodiments, the first device is a user device, cloud infrastructure, internet service provider infrastructure, a set top box, a cable modem, or a wireless router.

Some embodiments relate to a non-transitory computer readable medium having instructions stored thereon that, when executed by a processor, cause a processor to receive a first packet from a first node. The first packet includes latency information associated with a second packet provided to the first node for a low latency application. The instructions also cause the processor to provide a third packet to the first node or other nodes to increase priority for packets for the low latency application if the latency information indicates that a latency threshold for the low latency application has not been met. The first node can be part of a communication system including a cable, fiber optic, or wireless network. The other nodes and the first node are in path associated with the second packet provided to the first node for the low latency application.

In some embodiments, the processor is disposed on a server remote from the first node. In some embodiments, the server is in communication with internet service provider infrastructure and the third packet is provided to the internet service provider infrastructure. In some embodiments, the third packet is provided to internet service provider infrastructure, a set top box, a cable modem, or a wireless router.

In some embodiments, the instructions cause the processor to provide a fourth packet to the first node or the other nodes to decrease priority for packets for the low latency application if the latency information indicates that the latency threshold for the low latency application has been met and additional bandwidth is available.

In some embodiments, the latency information comprises a user identification.

Some embodiments relate to a method of providing low latency service. The method includes providing a first time stamp for a first packet provided to a first device. The first packet can be for reception by a low latency device or as being for use in a low latency operation. The method also includes providing a second packet including latency information to a server remote from the first device via a virtual communication link.

In some embodiments, the method also includes providing a second time stamp for the first packet provided to the first device. In some embodiments, the first time stamp is an ingress time stamp and the second time stamp is an egress time stamp. In some embodiments, the first device includes an application configured to append the first time stamp to the first packet.

Some embodiments relate to a server. The server includes a first application configured to monitor end-to-end latency for a network. The network includes devices. The application is configured to receive latency information from at least one of the devices. The latency information includes time stamps or time period data for a packet to communicated across a device or a link. Monitoring or monitor refers to an action where performance is observed, checked, and/or recorded and can generally occur over a period of time.

A non-transitory computer readable medium have instructions stored thereon that, when executed by a processor, cause the processor to receive a first packet from a first node. The first packet includes latency information associated with a second packet provided to the first node for a low latency application. The instructions also cause the processor to provide a subscription offer in response to the latency information. The first node is part of a communication system comprising a cable, fiber optic, or wireless network. The other nodes and the first node are in path associated with the second packet provided to the first node for the low latency application.

In some embodiments, the first device is a set top box, a cable modem, or a wireless router. A device can refer to any apparatus, system, or component for performing an operation in some embodiments. A low latency device can refer to any device capable of performing a low latency operation. A low latency operation refers to an operation where higher than low latency operation can affect performance level, user experience level or a requirement of the application or use in some embodiments. A packet refers to a unit of data that is transmitted over a network in some embodiments. The packet can include a header and a payload. Time stamps and latency information can be appended to a packet in some embodiments. Classify or classifying may refer to any operation for determining a classification, grouping or arrangement in some embodiments. For example, a packet can be classified as being for a low latency device or application by reviewing an address, appended data, by its type of data, or other information in some embodiments. Bandwidth may refer to an amount of capacity for communication in some embodiments. Priority refers to a precedence, hierarchical order, level, or other classification in some embodiments. For example, packets can be ordered for transmission in accordance with a priority associated with a latency requirement in some embodiments. A cable, fiber optic, or wireless network refers to any network that uses one or more of a fiber optic cable, a coaxial cable, an ethernet cable, other wire, or wireless medium in some embodiments.

For purposes of reading the description of the various embodiments below, the following descriptions of the sections of the specification and their respective contents may be helpful:

- Section A describes a communication system that may be useful for practicing the embodiments described herein.
- Section B describes low latency applications that may be useful for practicing the embodiments described herein.
- Section C describes embodiments of network environments and computing environments that may be useful for practicing the embodiments described herein.
- Section D describes embodiments of systems and methods of profiling low latency applications using telemetry.

A. Communication System

Network latency can significantly impact internet connectivity, user experience, and the performance of various online applications and services. Some embodiments provide information for ISPs to address end-to-end latency issues through network optimization, infrastructure upgrades, and efficient routing to ensure a reliable and responsive internet experience for their customers. In some embodiments, tools are provided so that cloud servers of ISPs can collect analytics data and can re-configure ISP provided devices like cable modems, GPON modems or set top boxes. In some embodiments, the systems and methods allow multiple parties (e.g., more than one ISP, cloud service providers, public switch operators, and application developers) to address low latency usages including but not limited to video conferencing, augmented reality (AR)/virtual reality (VR), and metaverse end to end usage. In some embodiments, the systems and methods allow multiple parties to cooperate and work together to address latency issues. In some embodiments, the systems and methods can be used with WiFi networks, Ethernet networks, modems, access network, backbone networks, IXPs, and cloud infrastructure and allow multiple teams to work together for latency optimizations across various mediums.

In some embodiments, a latency monitor measures and reports latency for each link, device, and end application. The reports are provided to controllers of the paths, such as, ISPs, application developers, end users, etc. so that actions can be taken once low latency requirements are not met. In some embodiments, systems and methods provide a seamless latency monitoring, analysis, and optimization. The analysis of latency measurements and reporting allows for identification of latency contributors in real time and optimization by mapping traffic requiring low latency traffic to low latency queues or paths. In some embodiments, devices in the path are provided with an application (e.g., software) for effecting monitoring, analysis, and optimization. The analysis of latency measurements and reporting allows for control of devices to appropriately provide low latency traffic to low latency queues or paths. The applications can be in communication with a latency server (e.g., a server for the applications) that coordinates operations and accumulates data according to the monitoring, analysis, and optimization operations. An application or app may refer to a software program or module configured to perform specific functions or tasks on an electronic device.

With reference FIG. 1A a communication system 100 includes a network 1002A for residences 1016A and 1018A, a network 1002B for residences 1016B and 1018B, a cloud infrastructure 1004, and a BQUICK_TOP server 1005. Communication system 100 advantageously is configured so that information is provided to ISPs to address latency issues through network optimization, infrastructure upgrades, service upgrades and/or efficient routing to ensure a reliable and responsive internet experience for customers can be achieved on networks 1002A and 1002B. BQUICK_TOP server 1005 is configured to receive the information and address latency issues in some embodiments. BQUICK_TOP server 1005 is in communication (e.g., via direct or virtual connections) with cloud infrastructure 1004 and networks 1002A and B (residences 1016A-B and 1018A-B) to share information, reports, commands, and other data in some embodiments. BQUICK_TOP server 1005, infrastructure 1004 and residences 1016A-B and 1018A-B can utilize any form of communication mediums, networks, protocols, etc. to communicate data and information.

Cloud infrastructure 1004 includes a collection of hardware, software, networking, and other resources that enable the delivery of cloud computing services over the internet in some embodiments. Cloud infrastructure 1004 includes physical servers, storage devices, networking equipment, and other hardware components hosted in data centers distributed across multiple geographic locations in some embodiments. The data centers are equipped with high-performance servers, storage arrays, and networking gear to support the computing needs of cloud services in some embodiments. The cloud infrastructure 1004 is configured to provide high-speed, redundant network links, routers, switches, and content delivery networks (CDNs) for delivery of low-latency, high-bandwidth content for users in some embodiments. Cloud infrastructure 1004 includes block storage (e.g., Amazon EBS, Azure Disk Storage), object storage (e.g., Amazon S3, Google Cloud Storage), and file storage (e.g., Amazon EFS, Azure Files) in some embodiments.

Residences 1016A and 1018A can include a network associated with a first ISP and residences 1016B and 1018B can include a network associate with the same ISP or a second ISP. In some embodiments, the networks for residences 1016A and 1018A and residences 1016B and 1018B are part of broadband access server (BAS) networks. Network 1002A includes infrastructure 1006A, a head end 1008A, a BQUICK ISP_A server 1012A, splitter 1014A, equipment for residence 1016A and equipment for residence 1018A. Equipment for residence 1018A includes an optical network unit (ONU) 1020, a user device 1022, and a television 1024. Modem or optical network unit 1020 can be a fiber optic router, switch, gateway etc. and have WiFi capabilities for a WiFi network associated with residence 1018A in some embodiments. Optical network unit 1020 is a GPON modem or optical network terminal (ONT) in some embodiments. GPON is a technology that allows for high-speed internet access over fiber optic cables. Optical network unit 1020 converts the optical signals transmitted over the fiber optic cables into electrical signals and/or radio frequency signals that can be used by devices in residence 1018A. Although system 100 is shown communicating via coaxial cable and optical cable, ground based wireless communications and satellite communications can be utilized in system 100. Optical network unit 1020 is generally provided by an optical network operator (ISP-A) and can be referred to as an optical network termination. BQUICK_TOP server 1005 and BQUICK ISP_A server 1012A can be Broadcom Analytics System (BAS Servers) that collect analytics data from various devices like modems, set top boxes, and other devices.

User device 1022 is a smart phone, AR/VR device, tablet, lap top computer, smart watch, exercise equipment, smart appliance, camera, headphone, automobile, other computing device, etc. Residence 1016A can have similar devices to residence 1018A. Television 1024 and user device 1022 communicate with optical network unit 1020 via a wireless network or wired connections. In some embodiments, optical network unit 1020 can include an ethernet router including wired connections to user device 1022, wireless modems, and television 1024.

Head end 1008A includes routers, switches, servers, and/or other infrastructure for communicating between ISP infrastructure 1006A and cloud infrastructure 1004. ISP infrastructure 1006A includes routers, switches, servers, and/or other infrastructure for communicating between head end 1008A and splitter 1014A. Splitter 1014A communicates via fiber optic cables between infrastructure 1006A and residences 1016A and 1018A, BQUICK ISP_A 1012A BQUICK_TOP server 1005 communicates with server 1012, infrastructure 1006A, head end 1008A and residences 1016A and 1018A via direct or indirect communication (e.g., via the Internet).

Splitter 1014A is a fiber optic splitter in some embodiments. Splitter 1014A can be used in fiber optic networks to divide an incoming optical signal into multiple separate signals for residences 1016A and 1018A and unify signals into one or more signals for infrastructure 1006A. Splitter 1014A can be configured for a passive optical network (PON) architecture. Bidirectional communication occurs across splitter 1014A in some embodiments. In some embodiments, splitter 114 is a conducting cable-type splitter (e.g., for a coaxial, not optical cable). Splitter 114 includes repeaters, amplifiers, signal conditioners, etc. in some embodiments.

BQUICK ISP_A server 1012A a computing device, such as a machine equipped with one or more processors, memory, and storage drives. BQUICK ISP_A server 1012A delivers assorted services to customers (e.g., residences 1016A and 1018A) for the ISP in some embodiments. BQUICK_TOP server 1005 is configured as a central hub responsible for managing and routing internet traffic for its subscribers. BQUICK ISP_A server 1012A handles requests from users such as accessing websites, sending emails, streaming content, and downloading files. BQUICK ISP_A server 1012A manages network protocols, assigns IP addresses, and facilitates communication between different devices on the internet. BQUICK ISP_A server 1012A includes operating systems like Linux or Windows Server, along with networking software such as routing protocols (e.g., BGP, OSPF), DNS (Domain Name System) servers, dynamic host configuration protocol (DHCP) servers for IP address allocation, and firewall/security software to protect system 100 from cyber threats. BQUICK ISP_A server 1012A employs traffic shaping and quality of service (QoS) mechanisms to prioritize and optimize internet traffic, ensuring a smooth and consistent user experience for all subscribers. These operations can involve managing bandwidth allocation, prioritizing certain types of traffic (e.g., VoIP or video streaming), and mitigating network congestion during peak usage periods and can be performed in response to information from server 1012. BQUICK ISP_A server 1012A employs monitoring tools or applications to continuously analyze traffic data to detect anomalies, troubleshoot network issues, and ensure compliance with service level agreements (SLAs) and regulatory requirements in some embodiments.

BQUICK_TOP server 1005 is a computing device similar to and is configured to communicate with servers 1012A and 1012B. BQUICK_TOP server 1005 includes software advantageously configured to address latency issues through network optimization, infrastructure upgrades, and efficient routing to ensure a reliable and responsive internet experience for their customers in some embodiments. BQUICK_TOP server 1005 can receive logs of network activity, including but not limited to traffic patterns, usage statistics, and security events from servers 1012A and 1012B in some embodiments. BQUICK_TOP server 1005 employs monitoring tools to continuously analyze traffic data to detect anomalies, troubleshoot network issues, and ensure compliance with service level agreements (SLAs) and regulatory requirements in some embodiments. In some embodiments, BQUICK_TOP server 1005 is a platform configured to perform latency monitoring in real time, latency analysis in real time, and latency optimization in real time. In some embodiments, the latency optimization is performed to provide a report indicating latency issues. BQUICK_TOP server 1005 can configure paths in networks 1002A and 1002B and controls devices in networks 1002A and 1002B so that low latency requirements are met in some embodiments.

BQUICK_TOP server 1005 and BQUICK ISP_B server 1012B are similar to BQUICK ISP_A server 1012A and is configured for operation with residences 1016B and 1018B. Residences 1016A, 1018A, 1016B and 1018B are similar to each other and can include similar devices. Residence 1018B includes a cable modem 1030B, a set top box 1036B, a game controller 1038, a television 1034 and a user device 1032. User device 1032 is similar to user device 1022. Head end 1008B is similar to head end 1008A, and ISP infrastructure 106B is similar to ISP infrastructure 1006A. Televisions 1024 and 1034 are monitors, smart televisions, or other audio/video equipment. Networks 1002A and 1002B can include cameras, security equipment, fire and safety equipment, smart appliances, etc. in communication with infrastructure 1006A and 106B in some embodiments. ISP infrastructure 1006A and 106B can each include fiber optic cable, coaxial cable, remote nodes, splitters, and other equipment for cable customers in some embodiments. The equipment can include amplifiers, remote physical devices or layers and remote media access control devices or layers. Intermediate nodes in ISP infrastructure 1006A and 106B can process data packets and monitor latency and traffic at various points in network. BQUICK_TOP server 1005, BQUICK ISP_B server 1012B, BQUICK_ISP_A server 1012A are controlled by ISPs (e.g., respective ISPs) in some embodiments.

ISP infrastructure 106B is coupled to residences 1016B and 1018B via a coaxial cable in some embodiments. Cable modem 1030B is a device configured to connect devices in residence 1018B to the ISP infrastructure 106B. Cable modem 1030 includes a computer, router, gateway, or other communication device in some embodiments. Modem 1030 can be configured to provide a wireless network for communicating with devices in residence 1018B. Repeaters, amplifiers, signal conditioners, etc. can be provided on the cable associated with modem 1030 in some embodiments. Cable modem refers to any device for communicating across a cable in some embodiments. Optical network unit 1020 and modem 1030 provide data connection to the ISPs data pipe over fiber or cable. All devices inside the home can be connected to the modem over WiFi or Ethernet for internet connectivity. Each node (e.g., routers, repeaters, modems, WiFi access points) inside the home can introduce latency. ONU 1020 and modem 1030 can be any device at a home or business that connects networking devices to ISPs provided internet data pipe over coaxial cable, fiber optic cable or digital subscriber line (DSL) or cell connection (e.g., via a tower (e.g. 5G, LTE modem)) in some embodiments.

Set top box 1036 is configured to receive and decode digital television signals for viewing on television 1034. Set top box 1036 can be configured for gaming operations and can communicate with a game controller 1038. Set top box 1036 can also be configured to provide internet access, shopping services, home automation, audio features, screen mirroring, etc. Set top box 1036 includes one or more processors, memory, dedicated graphics processing units (GPUs), and/or storage capacity for storing games, applications (apps), latency data, and recorded content in some embodiments. Set top box refers to any device that connects to a television set or monitor and allows users to receive and decode video signals. A set top box can serve as an interface between a television set and various broadcast media sources, such as cable, satellite, or internet-based streaming services in some embodiments. A dashed line in the drawings can represent a virtual connection and a solid line can represent a physical connection (e.g., wires or fiber optic cable).

The cloud infrastructure 1004, head end 1008A, and head end 1008B are in communication with the internet 1009 virtually or directly. Head end 1008A and head end 1008B can be associated with buildings 111A and 111B, respectively. Communication system 100 is generally an end to end combination of networking elements used for networking traffic from a home or business to internet 1009 (e.g., public internet) in some embodiments. In some embodiments, cloud infrastructure 1004 is a set multiple servers, switches, storage units. ISPs can have pool of data center/cloud servers co-located with head ends 1008A and 1008B or dedicated links to cloud infrastructure 1004 from head ends 1008A and 1008B and head end connections to internet 1009.

Although cloud infrastructure 1004 is shown as single block, cloud servers, data servers can be collocated with ISP head ends 1008A and/or 1008B. The cloud servers can be at third party private facility and ISPs can have dedicated physical links or links via internet 1009. Depending on congestion and server processing capabilities, cloud infrastructure 1004 can be a source of latency. Cloud server processing elements can be upgraded to support latency monitor applications (E.g., BQUICK applications) or can configure devices to support low latency services in some embodiments. Head ends 1008A and 1008B can be a central facility (e.g., a central office. A head end refers to a facility where internet data or audio/video content is received, processed, and routed to end subscribers like residential or business owners in some embodiments. Head ends 1008A and 1008B can have multiple switching, routing, data metering, queuing, security elements, and/or other devices which can introduce the latencies. Head ends 1008A and 1008B can also host Cable Modem Termination Systems (CMTS) in a cable network, DSLAM (Digital Subscriber Line Access Multiplexor) in a DSL network, and OLT (Optical Line Terminal) in a fiber network.

Networks 1002A and 1002B is operated by one of as ISP-A and ISP-B. ISPs extend their services to various residences or businesses within communities, cities, or specific regions. Networks 1002A and 1002B represents two distinct networks served by same or different ISPs, which may be situated in the same neighborhood or entirely different regions or countries. Homeowners or business proprietors seek out ISPs offering services in their local areas and subscribe to internet service accordingly.

B. Applications

System 100 advantageously includes an ISP infrastructure BQUICK application 1056A for ISP infrastructure 1006A, a head end BQUICK application 1058A for head end 1008A, a modem BQUICK application 1020A for optical network unit 1020, a user device BQUICK application 1022A for user device 1022, and a television BQUICK application 1024A for television 1024. Applications 1056A, 1058A, 1020A, 1022A, and 1024A can be software apps or programs designed to perform specific tasks or provide particular functions as described herein (e.g., latency monitoring, latency analysis, and latency optimization and the communication and storage of data related thereto). Applications 1056A, 1058A, 1020A, 1022A, and 1024A can be provided on any electronic devices in communications system 100 including but not limited to servers, computers, smartphones, tablets, smart devices, appliances, cameras, security devices, vehicles, user devices, and other digital platforms. In some embodiments, applications 1056A, 1058A, 1020A, 1022A, and 1024A can be executed on Windows, macOS, iOS, Android, or other operating systems or can be web-based and accessible through internet browsers. In some embodiments, applications 1056A, 1058A, 1020A, 1022A, and 1024A can be cross-platform with an ability to be executed on multiple OS environments. Applications 1056A, 1058A, 1020A, 1022A, and 1024A can be installed from various sources such as app stores, software repositories, or directly from ISP's website. In some embodiments, applications 1056A, 1058A, 1020A, 1022A, and 1024A are configured to communicate with BQUICK_TOP server 1005 via a virtual connection. In some embodiments, applications 1056A, 1058A, 1020A, 1022A, and 1024A are configured to communicate with BQUICK_TOP server 1005 via BQUICK ISP_A server 1012A. Applications 1056A, 1058A, 1020A, 1022A, and 1024A can be updated through app stores or via automatic updates depending on device settings.

BQUICK applications 1056A, 1058A, 1020A, 1022A, and 1024A are configured to facilitate integration and communication with other services or platforms, sharing of data, collaboration, and/or access to additional functionalities seamlessly. Applications 1056A, 1058A, 1020A, 1022A, and 1024A allow optical network unit 1020, television 1024 and user device 1022 to monitor latency, store subscription information (e.g., classic bandwidth in Megabits per second (MPPS), monitor low latency bandwidth (MBPS), max jitter in milliseconds), and provide options for upgrading internet service. The latency information and subscription information can be tracked according to device, device type, user identification, application, residence identification, etc. in some embodiments. The latency information can be provided in a packet with a time stamp to BQUICK_TOP server 1005 in some embodiments. A user interface can be provided by applications 1056A, 1058A, 1020A, 1022A, and 1024A on optical network unit 1020, television 1024 and user device 1022 to upgrade or downgrade to a different level of service in light of latency information. The different level of service can be provided to latency server 150 and BQUICK_TOP server 1005, BQUICK ISP_A BQUICK server 1012A, or BQUICK ISP_B BQUICK server 1012B in some embodiments.

System 100 advantageously includes an ISP infrastructure BQUICK application 156B for ISP infrastructure 106B, a head end BQUICK application 1058B associated with head end 1008B, a modem BQUICK application 1030B for modem 1030, and a set top box BQUICK application 1036B for set top box. Applications 156B, 1058B, 1030B, and 1036B are similar to applications 1056A, 1058A, 1020A, 1022A, and 1024A. In some embodiments, when applications 1030B, 1036B, 1056A, 156B, 1058B, 1058A, 1020A, 1022A, and 1024A are installed or associated devices join the network, the applications 1030B, 1036B, 1056A, 156B, 1058B, 1058A, 1020A, 1022A, and 1024A register at server 1012 as being compliant for operations described herein. User device 1032, television 1034, and game controller 1038 can also include an application similar to BQUICK applications 1022A and 1024A.

In some embodiments, BQUICK applications 1030B, 1036B, 1056A, 156B, 1058B, 1058A, 10201020A, 1022A, and 1024A are latency applications and are configured to communicate data so that a topology report can be provided. The topology report identifies devices/networks from end-to-end. Latency requirements of each device is provided in the report (e.g., on a device by device, type of usage by type of usage, user ID by user ID, or application by application basis) in some embodiments. The report can be stored at server 1012 in some embodiments. The latency requirements across the topology can be used to shape traffic, prioritize flow, etc. In some embodiments, the report tracks which devices are offline so that bandwidth reserved for those devices can be used for another device in some embodiments. In some embodiments, the report tracks whether the device is not running a low latency (e.g., BQUICK) application and yet is online so that bandwidth reserved for that device can be used for other devices in some embodiments. Offline refers to a state where a device, system, or application is not actively communicating with other devices or accessing online resources in some embodiments. A device that is off or asleep is offline in some embodiments. A low latency application can be offline when the low latency application is not running in some embodiments.

In some embodiments, the low latency packets are marked so that applications 1030B, and 1036B, 1056A, 156B, 1058B, 1058A, 1020A, 1022A, and 1024A can process the packets and flow as a low latency flow. In some embodiments, the end device (e.g., application 1024A) can send a command or request indicating that latency requirements are not being met and each application in the path (applications 1020A 1056A, and 1058A) can respond to that command to process the packets for that device at a higher priority or remove traffic from that path in some embodiments. Latency issues can be sourced from an AP, a mesh, a device, or a node. Tracking bit rates or latencies at each location allow solutions to be directed to the particular location of the latency issue.

Figure 1B:
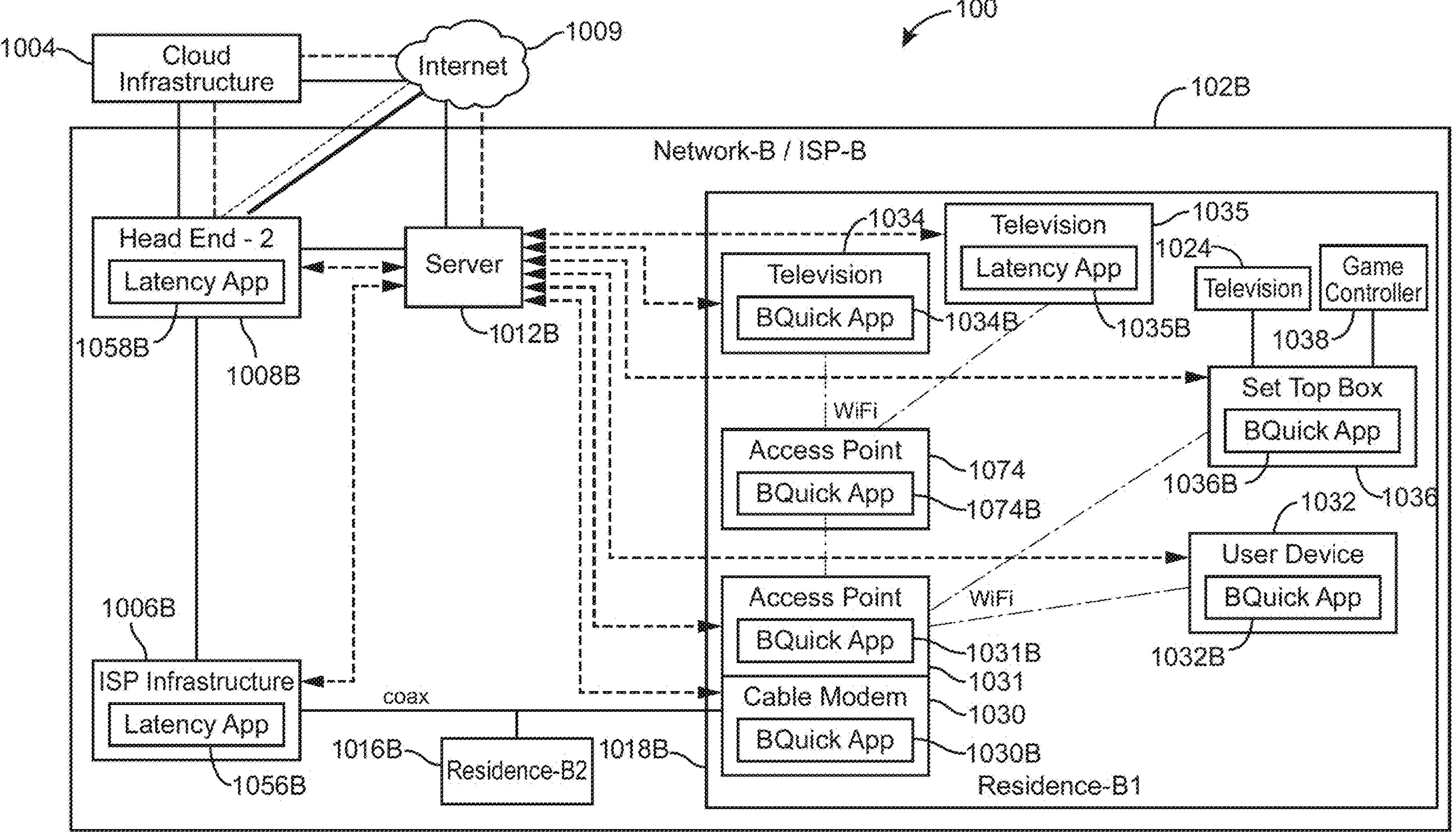
FIG. 1B is a general schematic block diagram of portion of the communication system illustrated in FIG. 1A, in accordance with one or more embodiments.

With reference to FIG. 1B, residence 1018B can include an access point 1031 in communication with modem 1030, a wireless router 1074 in communication with television

1034, a television 1035, set top box 1036, and user device 1032. Access point 1031 can be integrated with modem 1030 or can be a separate unit. User device 1032 includes a user device BQUICK application 1032B, and access point 1031 includes a latency access point application 1031B. Router 1074 includes a wireless router BQUICK application 1074B, television 1034 includes a television BQUICK application 1034B, and television 1035 includes a television BQUICK application 1035B. BQUICK_TOP server 1005, BQUICK_ISP_A server 1012A, and BQUICK_ISP_B server 1012B are in virtual communication with applications 1030B, 1031B, 1036B, 1074B 1032B, 1034B, 1035B, 156B, and 1058B in some embodiments. A server refers to any computing device that provides services or resources to other computers or clients within a network in some embodiments.

Applications 1030B, 1031B, 1036B, 1074B, 1032B, 1034B, 1035B, 156B, and 1058B are similar to applications 1056A, 1058A, 1020A, 1022A, and 1024A. Applications 1030B, 1031B, 1036B, 1074B, 1032B, 1034B, 1035B, 156B, and 1058B allow modem 1030, televisions 1034 and 1035, access point 1031, router 1074, set top box 1036, and user device 1032 as well as other cable modem termination systems to monitor latency, store subscription information (e.g., classic bandwidth in Megabits per second (MPPS), low latency bandwidth (MBPS), max jitter in milliseconds), and provide options for upgrading internet service. A user interface can be provided on optical network unit 1020, television 1024 and user device 1022 to upgrade or downgrade to a different level of service in light of latency information. This ability is available even if the devices are third party devices in some embodiments. In some embodiments, application 1031B or 1074B can be configured to update network topology information to BQUICK TOP server 1012, and applications 1030B, 1031B, 1036B, 1074B, 1032B, 1034B, 1035B, 156B, and 1058B can monitor low latency resources, request services, register devices, and request different latency treatment (e.g., for video, audio, commands, downloads, etc.). In some embodiments, devices or nodes associated with applications 1030B, 1031B, 1036B, 1074B 1032B, 1034B, 1035B, 156B, and 1058B can include algorithms for changing packet priority with time and latency requirements. Applications 1030B, 1031B, 1036B, 1074B, 1032B, 1034B, 1035B, 156B, and 1058B can communicate using virtual or logical connections (e.g., using internet 1009).

Access point 1031 is a networking device that allows Wi-Fi-enabled devices to connect to a wired network. Access point 1031 serves as a bridge between wireless devices, such as wireless router 1074, set top box 1036, user device 1032, televisions 1034 and 1035, and the wired network infrastructure, such as, modem 1030, routers, switches, and servers, in some embodiments. Wireless router 1074 can be a networking device that provides a wireless access point for a wireless network. Wireless router 1074 serves as a hub for a wireless local area network (LAN), allowing multiple devices in or around residence 1018B to connect to the internet and communicate with each other. Wireless router 1074 can include wirelessly built-in Ethernet switches which provide multiple ports for connecting wired devices. A wired connection can connect router 1074 to access point 1031 or modem 1030 in some embodiments. Wireless router refers to any device that provides a wireless access point for a wireless network in some embodiments.

Figure 1C:
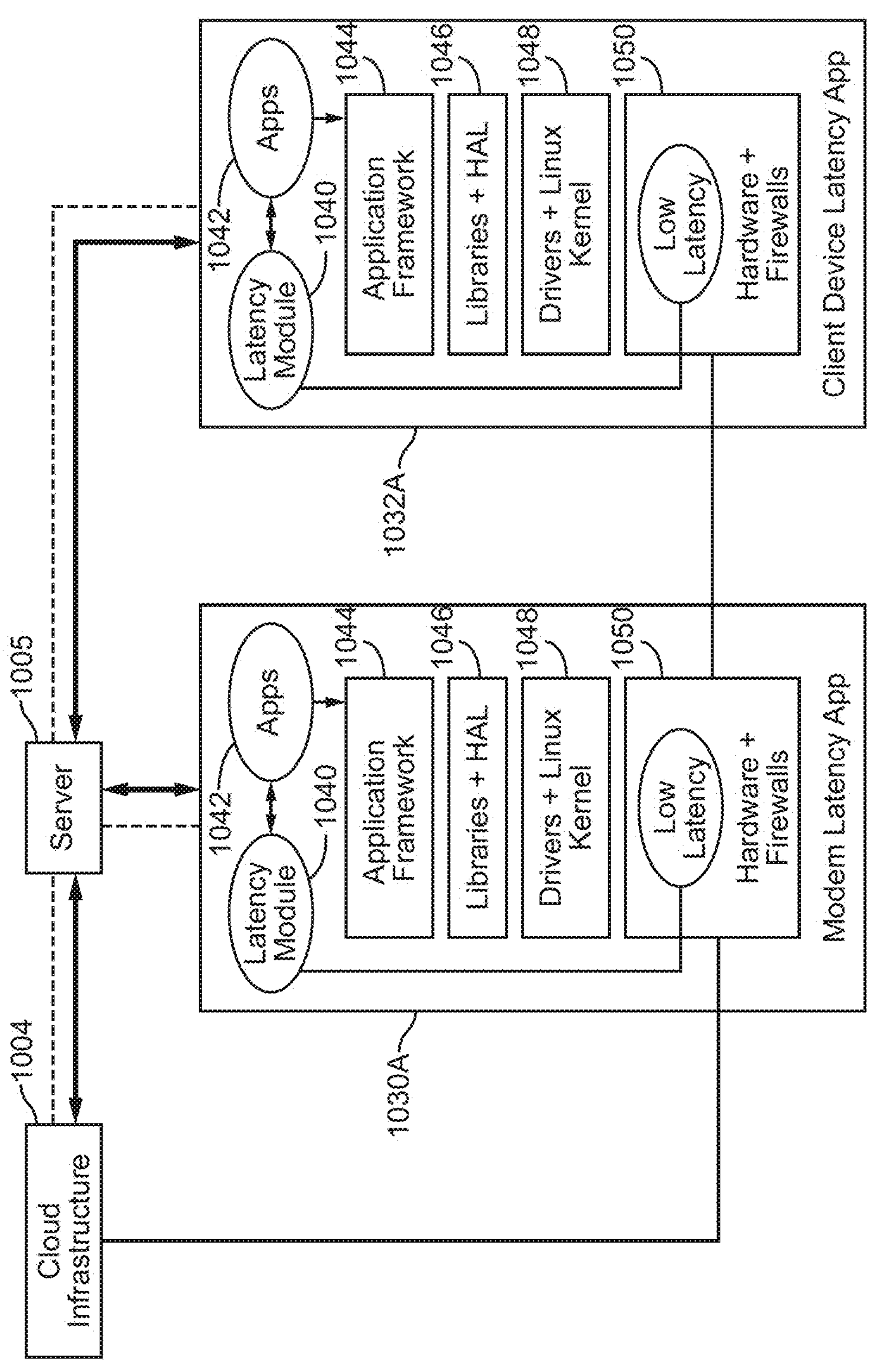
FIG. 1C is a general schematic block diagram of applications in communication with cloud infrastructure for the communication system illustrated in FIG. 1A, in accordance with one or more embodiments.

With reference to FIGS. 1B-1C, applications 1030B and 1032B are in communication with BQUICK_TOP server 1005 via a logical interface. The architecture of applications 1030B and 1032B can be used in any of applications 1031B, 1036B, 1074B 1034B, 1035B, 156B, 1058B, 1056A, 1058A, 1020A, 1022A, and 1024A. The logical interface is a virtual interface that represents a specific network configuration or functionality within a networking device, such as modem 1030 or user device 1032. The logical interface is software defined and can be created, configured, and managed within the device's operating system in some embodiments. Applications 1030B and 1032B can be provided with modems, routers, access points, mesh devices, set top boxes, ARNR devices, game consoles, phones, over the top devices (OTTs), etc. Applications 1030B, 1032B, and cloud infrastructure 1004 can communicate using app to app communication. App to app communication is an exchange of data, messages, or commands between two or more software applications running on the same device or different devices over a network in some embodiments. App to app communication enables seamless integration and collaboration between different apps, allowing them to share information, trigger actions, or synchronize state without requiring user intervention in some embodiments. BQUICK_TOP server 1012 can include an application for monitoring and/or determining end to end latency.

In some embodiments, applications 1020A, 1024A, 1032B, 1034B, 1035B, 1036B, and 1032B are client level applications. Applications 1036B can be configured for highest priority (e.g., lowest latency applications) while ordinary streaming latencies are associated with applications 1020A, 1024A, 1032B, 1034B, 1035B, 1032B. Applications 137A and 1031B are node level application and can be configured to provide or assign priority for applications 1020A, 1024A, 1032B, 1034B, 1035B, 1036B, and 1032B (client level applications) and associated devices. Application 1030B can be configured to provide or assign priority between application 1036B, applications 137A and 1031B (e.g., node level applications), and applications 1020A, 1024A, 1032B, 1034B, 1035B, and 1032B (e.g., client level applications) as well as their associated devices. Cloud level applications can include applications 156B and 1058B in some embodiments. In some embodiments, the partitioning of applications 156B, 1058B, 1020A, 1024A, 1030B, 1032B, 1034B, 1035B, 1036B, 137A, and 1032B allows for segregation of local and cloud processing, reduction in cloud server communication and ISP bandwidth, local data storage and security, availability of local resources (including edge processing and filtering of information), and faster response to low latency devices. In some embodiments, application 1030B has a server extension and handles communication between server 1012 and applications 1020A, 1024A, 1032B, 1034B, 1035B, 1036B, and 1032B.

When application 1030B includes the server extension, application 1030B can be a client level application or a cloud level application and maintain a virtual connection to server 1012 in some embodiments. The server extensions can provide advantages of decoupling development from ISPs which can be helpful for standardization, of having a direct data path from application 1020A or 1031B to app developer servers, of maintaining local data privacy, of availability of local resources (e.g., local machine learning (ML), edge processing and filtering information), and of faster response to local low latency gadgets or devices in some embodiments.

In some embodiments, applications 156B, 1058B, 1020A, 1024A, 1030B, 1032B, 1034B, 1035B, 1036B, 137A, and 1032B can achieve synchronization of the wall clock across all nodes and end user devices. Applications 156B, 1058B, 1020A, 1024A, 1030B, 1032B, 1034B, 1035B, 1036B,

137A, and 1032B utilize timestamps for low-latency data packets at each node. This enhancement enables the determination of latency at each node and reporting to server 1012 in some embodiments. By utilizing a precision time protocol (PTP), applications 156B, 1058B, 1020A, 1024A, 1030B, 1032B, 1034B, 1035B, 1036B, 137A, and 1032B can distinguish whether latency arises from the home network, an ISP, or cloud servers using time stamps in some embodiments. Each device can have an associated PTP clock that communicates with the application associated with the device. The latency per node can be shared across networks so that networks can avoid devices having latency issues or can perform other operations to reduce latency at that node (e.g., divert higher latency traffic away from the node having issues). The PTP clock can be derived form a satellite clock in some embodiments.

With reference to FIG. 1C, applications 1030B and 1032B each include a latency module 1040, applications 1042, an application framework 1044, libraries and hardware abstraction layer 1046, drivers and linux kernel 1048, and hardware and firewalls 1050. In some embodiments, latency module 1040 is configured to control and monitor hardware and firewalls based upon latency. Latency module or BQUICK module 1040 is software configured to provide the low latency operations described herein. Applications 1042 are apps for performing various operations and can include third part apps (e.g., android package kit (APK)). Application framework 1044 is a structured set of software components that provide the necessary infrastructure for building and running applications.

Libraries and hardware abstraction layer 1046 provides standardized interfaces for device drivers to interact with hardware components. Libraries and hardware abstraction layer 1046 allows applications and system services to access hardware functionalities in a consistent manner across different devices. Libraries and hardware abstraction layer 1046 provide collections of pre-written code that developers can use to perform common tasks or implement specific functionalities and generally contain reusable functions, classes, or modules that provide specific capabilities.

Drivers and linux kernel 1048 serves as the bridge between the hardware and the software layers of the system, managing system resources in some embodiments. Drivers and linux kernel 1048 provide essential services and facilitate communication between software processes and hardware devices in some embodiments. Drivers and linux kernel 1048 includes software components that facilitate communication between the operating system (OS) and hardware devices in some embodiments.

Figures 1D, 1E:
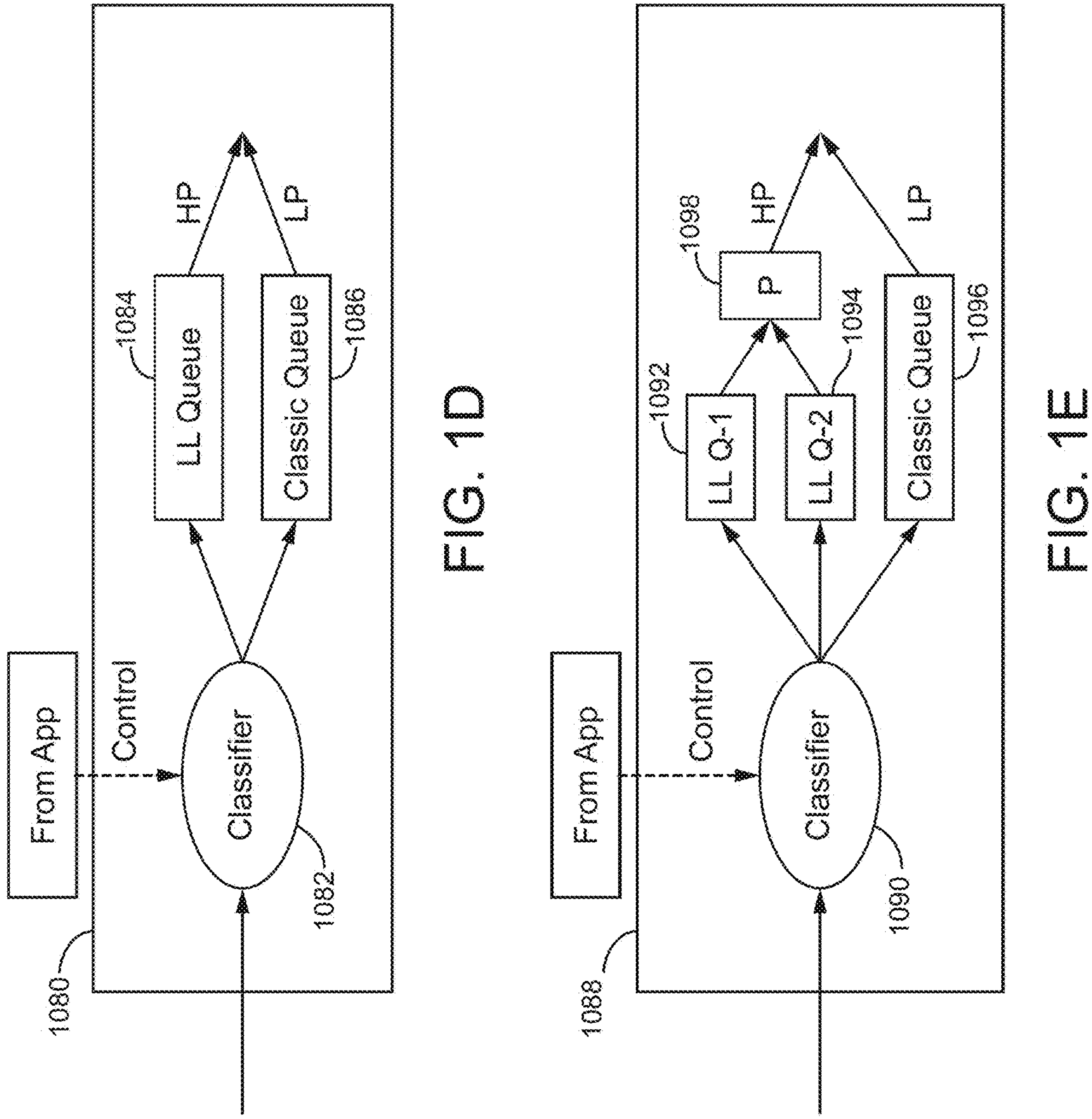
FIG. 1D is a general schematic flow diagram of an operation for the communication system illustrated in FIG. 1A, in accordance with one or more embodiments.
FIG. 1E is a general schematic flow diagram of an operation for the communication system illustrated in FIG. 1A, in accordance with one or more embodiments.

With reference to FIG. 1D, a function, service, process, or operation 1080 can controlled by any of applications 1030B, 1031B, 1036B, 1074B, 1032B, 1034B, 1035B, 156B, 1058B, 1056A, 1058A, 1020A, 1022A, and 1024A (FIGS. 1A and 1B). Operation 1080 use a classifier 1082, a low latency queue 1084, and a classic queue 1086. Queues 1084 and 1086 are memory or data structures used to manage the flow of packets or messages within a network device or system 100 (FIG. 1A). Queue 1084 is associated with a high performance path, and queue 1086 is associated with a low performance path in some embodiments. A queue refers to any structure for storing information (e.g., packets) in some embodiments. Any networking device can have separate queue to support low latency traffic and operation can be performed any device in communication system 100 (FIG. 1A). Applications 1030B, 1031B, 1036B, 1074B, 1032B, 1034B, 1035B, 156B, 1058B, 1056A, 1058A, 1020A, 1022A, and 1024A can report latency for each queue independently.

Queues 1084 and 1086 are configured as first-in-first-out (FIFO) buffers that temporarily hold packets or messages before messages are transmitted or processed in some embodiments. Queue 1084 can store messages for the high performance path (e.g., low latency path), and queue 1086 can store messages for the low performance path (e.g., high latency path) in some embodiments. In some embodiments, a low latency operations may use a low performance path, and a high latency operations may use the high performance path, or each uses the same path. A path refers to any communication route or channel through which data or information travels from a source to a destination (e.g., through devices and across mediums) in some embodiments. A path can include intermediate components and links involved in transmitting data between two or more points in one or more networks in some embodiments. A low latency path refers to a path for low latency traffic in some embodiments.

Classifier 1082 is processor and/or software configured to categorize or classify network traffic based on certain criteria (e.g., by latency requirements and/or priority). Classifier 1082 is configured to enforce network policies, prioritize traffic (e.g., for the high performance or low performance path), and/or apply specific actions based on the classification results in some embodiments. Classifier 1082 is used to differentiate between different classes of traffic (e.g., voice, video, data) and apply QoS policies to ensure that critical applications receive adequate bandwidth and latency requirements. Classifier 1082 prioritizes traffic based on predefined criteria, ensuring that important or time-sensitive applications receive preferential treatment over less critical traffic by appropriately providing traffic to queue 1084 and queue 1086. Classifier 1082 can utilize information about customer subscriptions (e.g., device level, user level, residence level) to classify traffic in some embodiments.

With reference to FIG. 1E, an operation 1088 can be controlled by any of applications 1030B, 1031B, 1036B, 1074B, 1032B, 1034B, 1035B, 156B, 1058B, 1056A, 1058A, 1020A, 1022A, and 1024A. Operation 1088 is similar to operation 1080 and utilizes a classifier 1090, a first low latency queue 1092, a second latency latency queue 1094, a classic queue 1096, and a priority queue 510. Queues 1092, 1094, 1096 and 1098 are memory or data structures used to manage the flow of packets or messages within a network device or system 100 (FIG. 1A). Queues 1092 and 1094 are associated with a high performance path, and queue 1096 is associated with a low performance path in some embodiments. Queue 1098 receives messages from queues 1092 and 1094 and provide messages or data to the high performance path based upon a priority scheme associated with queues 1092 and 1094 in some embodiments. Classifier 1090 is similar to classifier 1082 and is configured to categorize or classifying network traffic based on certain criteria (e.g., by latency requirements) for queues 1092, 1094, and 1096 in some embodiments. In some embodiments, classifiers 1082 and 1090 are software modules operating on a device (e.g., server, ISP supplied device, user device, etc.). In some embodiments, queues 1084, 1086, 1092, 1094, 1096 and 1098 are virtual queues provided on the memory of the device configured by operation 1080 or 1088. In some embodiments, queues 1084, 1086, 1092, 1094, 1096 and 1098 are dedicated hardware queues (e.g., FIFO memories) on the device. Classifiers 1090 and 1082 and queues 1084, 1086, 1092, 1094, 1096 and 1098 are implemented in an application layer of the device and may utilize services and structures provided by the media access layer and the physical layer in some embodiments. Classifiers 1082 and 1090 can be configured by commands provided by BQUICK TOP server 1012 to appropriately classify low latency traffic in some embodiments.

In some embodiments, applications 1080 and 1088 are configured to operate at nodes associated with devices including but not limited to ONU 1020, modem 1030, set top box 1036, television 1024, access point 1031, user device 1032, and/or router 1074. Applications 1080 and 1088 are configured to control and/or partition subscribed low latency bandwidth traffic (e.g., 20 Mbps vs 50 Mbps), track latency statistics (e.g., minimum, maximum, average latencies for low latency flows), process five tuples (e.g., source IP address, source port, destination IP address, destination port, transport protocol) for X number of flows (where X is any integer) with latency and/or bandwidth requirements, monitor latency introduced by a node, provide timestamps at ingress and egress ports, monitor buffer depths, perform boundary clock precision protocol (e.g., IEEE 10588-2008 standard and extensions thereof), and prioritize of traffic among multiple low latency clients. Monitored and measured information can be appended to packets for provision to other nodes and servers (e.g., server 1012). For example, time stamps can be applied to packets at each node or device. Latency can be determined by comparing time stamps. Applications 1080 and 1088 are also configured to track status of low latency applications and provide a user interface for controlling low latency configurations in some embodiments. Classifiers 1082 and 1090 and/or queues 1084, 1086, 1092, 1094, 1096 are configured by applications 1030B, 1031B, 1036B, 1074B, 1032B, 1034B, 1035B, 156B, 1058B, 1056A, 1058A, 1020A, 1022A, and 1024A (e.g., at each respective node) in some embodiments. In some embodiments, servers 1012, 1012A, and 1012B configure classifiers 1082 and 1090 and/or queues 1084, 1086, 1092, 1094, 1096 via virtual connections.

Applications 1080 and 1088 can identify end to end bandwidth available for low latency applications, provide a user real time feedback of monitored latency, and adjust latency responses. The adjustment may be in response to purchased services or bandwidth upgrades in some embodiments. In some embodiments, applications 1080 and 1088 can be configured to provide an advertisement or customer offer for low latency resources. Applications 1080 and 1088 can address variable latency for each user and adjust response for the latency level at a particular time, for a particular time period, etc. Latency information can be communicated to servers 1012A, 1012B, and 1012 and applications 1030B, 1031B, 1036B, 1074B, 1032B, 1034B, 1035B, 156B, 1058B, 1056A, 1058A, 1020A, 1022A, and 1024A as timestamps appended to packets as described herein, or to a packet identifier (e.g. 5 tuples and sequence number) in some embodiments. The time stamp information can be sent to servers 1012A, 1012B, and/or 1012 via an independent virtual/logical channel in some embodiments.

Figure 1F:
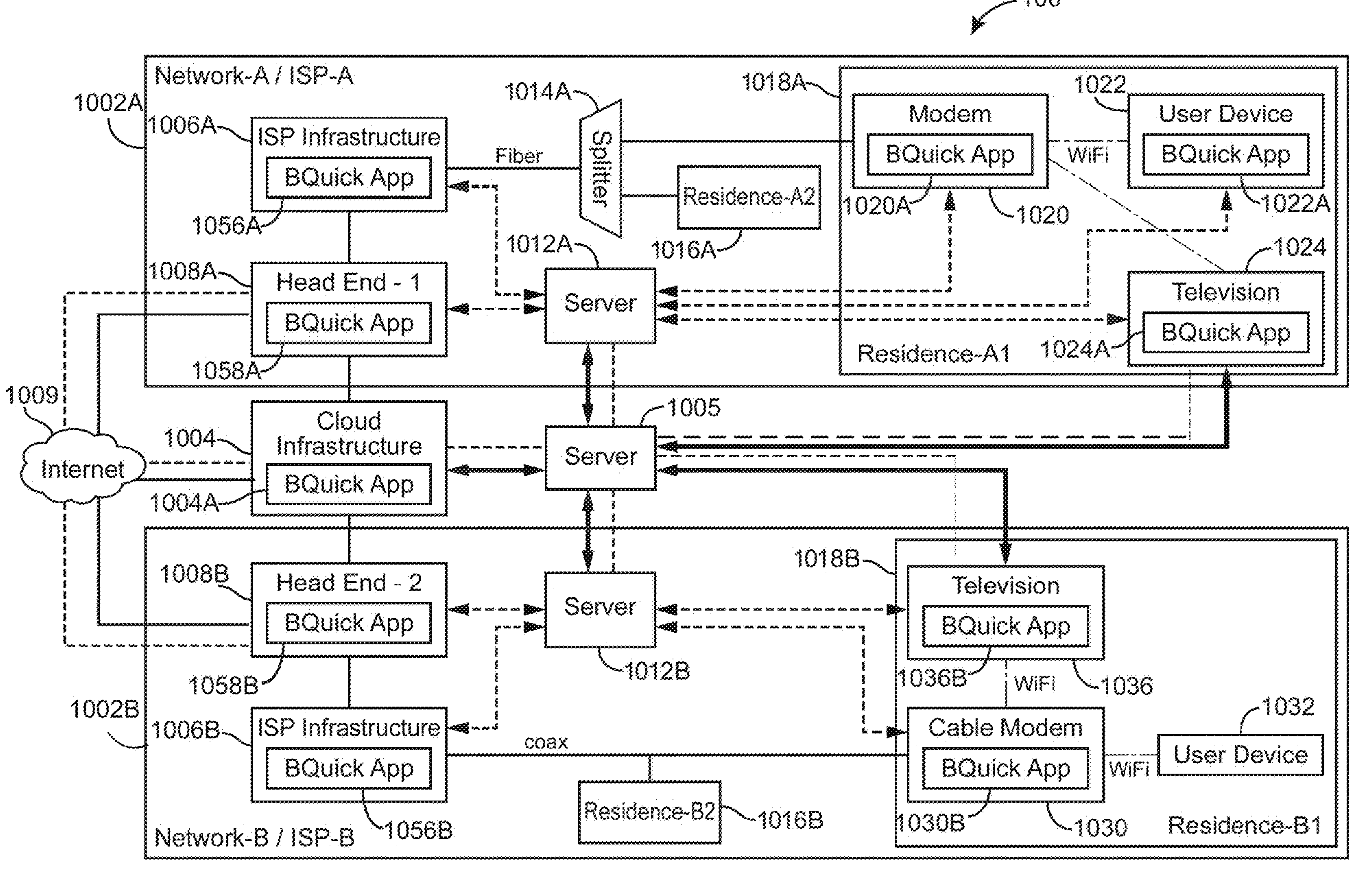
FIG. 1F is a schematic block diagram of the communication system illustrated in FIG. 1A including a server configured for augmented reality/virtual reality and/or meta-verse applications, in accordance with one or more embodiments.

With reference to FIG. 1F, cloud infrastructure 1004 can include an application 1004A. Application 1004A is similar to applications 1030B, 1031B, 1036B, 1074B 1032B, 1034B, 1035B, 156B, and 1058B. BQUICK TOP server 1012 can be configured to monitor AR/VR applications and/or metaverse applications. An application executed on BQUICK TOP server 1012 can perform the monitoring functions. Application 1004A is in communication with BQUICK TOP server 1012. Servers 1012A and 1012B can include an application similar to application 1004A.

Using applications, 1020A, 1024A, 1030B, 1032B, 1034B, 1035B, 1036B, 137A, and 1032B, the devices given by ISPs, customer-owned AR/VR setups, mobile phones, over the top (OTT) devices, and cloud gaming clients are capable of facilitating low latency uses. Applications, 1020A, 1024A, 1030B, 1032B, 1034B, 1035B, 1036B, 137A, and 1032B allow devices in residences 1018A and 1018B to interact with the server extension integrated in the ONU 1020 and modems 1030 or routers (e.g., ISP provided). Additionally, the server extensions have the ability to filter and transmit all necessary information to servers 1012A and 1012B or share open data with application developers.

C. Computing Environment

Prior to discussing the specifics of embodiments of the systems and methods of the present solution, it may be helpful to discuss the computing environments in which such embodiments may be deployed.

Figure 2A:
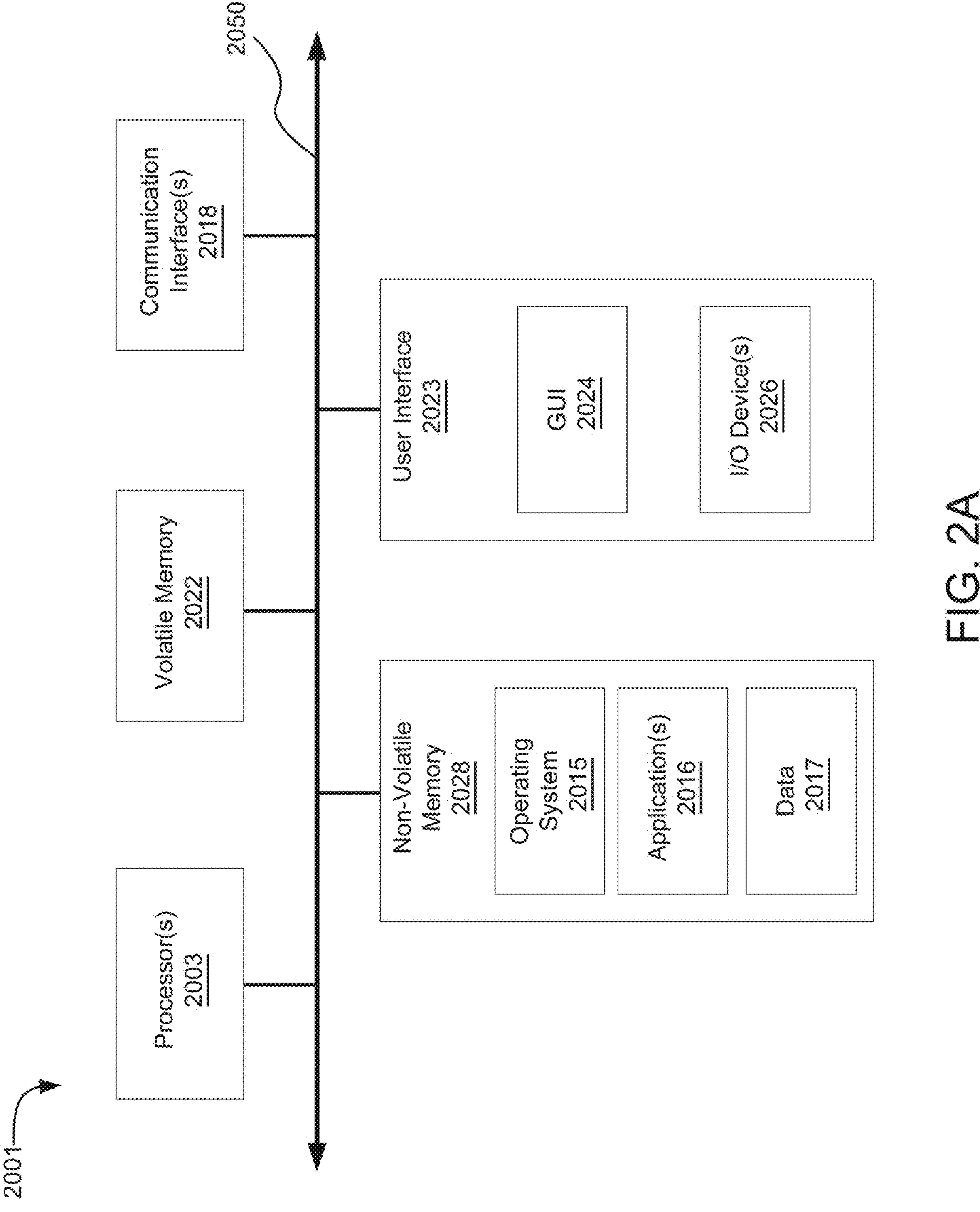
FIG. 2A illustrates a block diagram of embodiments of a computing device, in accordance with one or more embodiments.

As shown in FIG. 2A, computer 2001 may include one or more processors 2003, volatile memory 2022 (e.g., random access memory (RAM)), non-volatile memory 2028 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 2023, one or more communications interfaces 2018, and communication bus 2050. User interface 2023 may include graphical user interface (GUI) 2024 (e.g., a touchscreen, a display, etc.) and one or more input/output (I/O) devices 2026 (e.g., a mouse, a keyboard, a microphone, one or more speakers, one or more cameras, one or more biometric scanners, one or more environmental sensors, one or more accelerometers, etc.). Non-volatile memory 2028 stores operating system 2015, one or more applications 2016, and data 2017 such that, for example, computer instructions of operating system 2015 and/or applications 2016 are executed by processor(s) 2003 out of volatile memory 2022. In some embodiments, volatile memory 2022 may include one or more types of RAM and/or a cache memory that may offer a faster response time than a main memory. Data may be entered using an input device of GUI 2024 or received from I/O device(s) 2026. Various elements of computer 2001 may communicate via one or more communication buses, shown as communication bus 2050.

Computer 2001 as shown in FIG. 2A is shown merely as an example, as clients, servers, intermediary and other networking devices and may be implemented by any computing or processing environment and with any type of machine or set of machines that may have suitable hardware and/or software capable of operating as described herein. Processor(s) 2003 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 2018 may include one or more interfaces to enable computer 2001 to access a computer network such as a Local Area Network (LAN), a Wide Area Network (WAN), a Personal Area Network (PAN), or the Internet through a variety of wired and/or wireless or cellular connections.

In some implementations, the computing device 2001 may execute an application on behalf of a user of a client computing device. For example, the computing device 2001 may execute a virtual machine, which provides an execution session within which applications execute on behalf of a user or a client computing device, such as a hosted desktop session. The computing device 2001 may also execute a terminal services session to provide a hosted desktop environment. The computing device 2001 may provide access to a computing environment including one or more of: one or more applications, one or more desktop applications, and one or more desktop sessions in which one or more applications may execute.

Figure 2B:
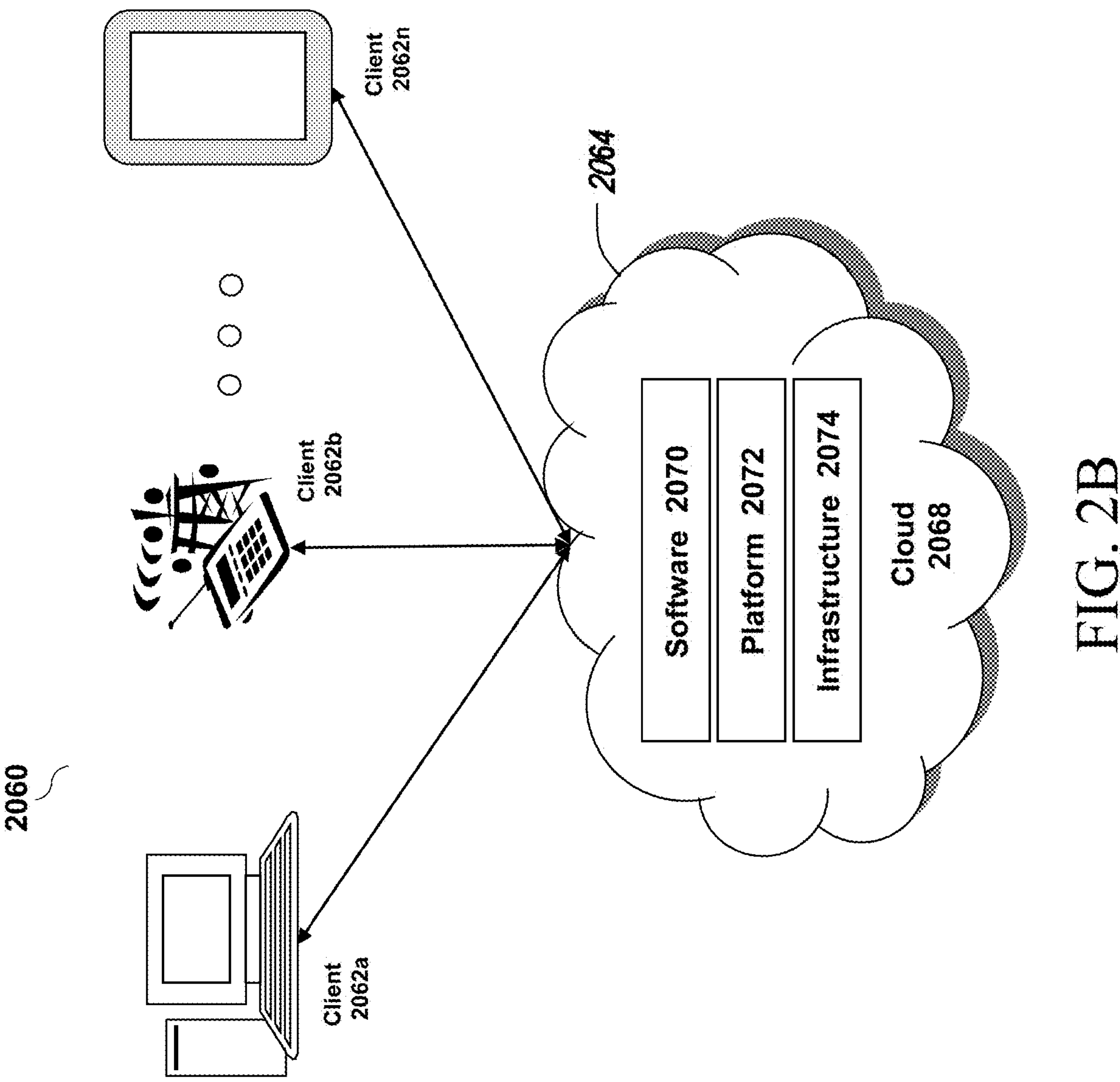
FIG. 2B illustrates a block diagram depicting a computing environment comprising a client device in communication with cloud service providers, in accordance with one or more embodiments.

Referring to FIG. 2B, a computing environment 2060 is depicted. Computing environment 2060 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 2060 can provide the delivery of shared services (e.g., computer services) and shared resources (e.g., computer resources) to multiple users. For example, the computing environment 2060 can include an environment or system for providing or delivering access to a plurality of shared services and resources to a plurality of users through the internet. The shared resources and services can include, but not limited to, networks, network bandwidth, servers, processing, memory, storage, applications, virtual machines, databases, software, hardware, analytics, and intelligence.

In embodiments, the computing environment 2060 may provide client 2062 with one or more resources provided by a network environment. The computing environment 2062 may include one or more clients 2062*a*-2062*n*, in communication with a cloud 2068 over one or more networks 2064. Clients 2062 may include, e.g., thick clients, thin clients, and zero clients. The cloud 108 may include back end platforms, e.g., servers 106, storage, server farms or data centers. The clients 2062 can be the same as or substantially similar to computer 2001 of FIG. 2A.

The users or clients 2062 can correspond to a single organization or multiple organizations. For example, the computing environment 2060 can include a private cloud serving a single organization (e.g., enterprise cloud). The computing environment 2060 can include a community cloud or public cloud serving multiple organizations. In embodiments, the computing environment 2060 can include a hybrid cloud that is a combination of a public cloud and a private cloud. For example, the cloud 108 may be public, private, or hybrid. Public clouds 108 may include public servers that are maintained by third parties to the clients 2062 or the owners of the clients 2062. The servers may be located off-site in remote geographical locations as disclosed above or otherwise. Public clouds 2068 may be connected to the servers over a public network 2064. Private clouds 2068 may include private servers that are physically maintained by clients 2062 or owners of clients 2062. Private clouds 2068 may be connected to the servers over a private network 2064. Hybrid clouds 2068 may include both the private and public networks 2064 and servers.

The cloud 2068 may include back end platforms, e.g., servers, storage, server farms or data centers. For example, the cloud 2068 can include or correspond to a server or system remote from one or more clients 2062 to provide third party control over a pool of shared services and resources. The computing environment 2060 can provide resource pooling to serve multiple users via clients 2062 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 2060 can provide on-demand self-service to unilaterally provision computing capabilities (e.g., server time, network storage) across a network for multiple clients 2062. The computing environment 2060 can provide an elasticity to dynamically scale out or scale in responsive to different demands from one or more clients 2062. In some embodiments, the computing environment 2060 can include or provide monitoring services to monitor, control and/or generate reports corresponding to the provided shared services and resources.

In some embodiments, the computing environment 2060 can include and provide different types of cloud computing services. For example, the computing environment 2060 can include Infrastructure as a service (IaaS). The computing environment 2060 can include Platform as a service (PaaS). The computing environment 2060 can include serverless computing. The computing environment 2060 can include Software as a service (SaaS). For example, the cloud 2068 may also include a cloud based delivery, e.g. Software as a Service (SaaS) 2070, Platform as a Service (PaaS) 2072, and Infrastructure as a Service (IaaS) 2074. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com. Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by Right Scale, Inc., of Santa Barbara, California. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 2062 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 2062 may access PaaS resources with different PaaS interfaces. Some PaaS interfaces use HTTP packages, standard Java APIs, Java Mail API, Java Data Objects (JDO), Java Persistence API (JPA), Python APIs, web integration APIs for different programming languages including, e.g., Rack for Ruby, WSGI for Python, or PSGI for Per, or other APIs that may be built on REST, HTTP, XML, or other protocols. Clients 2062 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 2062 may also access SaaS resources through smartphone or tablet applications, including, e.g., Salesforce Sales Cloud, or Google Drive app. Clients 2062 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Although examples of communications systems described above may include devices operating according to an Ethernet and other standards, it should be understood that embodiments of the systems and methods described can operate according to alternative standards and use wireless communications devices other than devices configured as devices. For example, multiple-unit communication interfaces associated with cellular networks, satellite communications, vehicle communication networks, wired networks, and networks can utilize the systems and methods described herein without departing from the scope of the systems and methods described herein.

D. Systems and Methods for Profiling Low Latency Applications Using Telemetry

In a network environment, interconnected devices, such as computers, servers, routers, switches, or internet-of-things (IoT) devices, among others, can form a web of communication pathways. These devices can communicate with each other using one or more applications that facilitate the exchange or communication of data or information. Different types of applications may be utilized for varying purposes or functionalities, ranging from basic data exchange to latency-sensitive content delivery (e.g., audio and video streams). Applications for latency-sensitive contents can be referred to as low latency applications or real time applications, designed to operate with relatively short response times to ensure near-instantaneous communication and interaction between users or devices. Examples of low latency applications can include but are not limited to, teleconference applications, online gaming applications, virtual reality (VR) simulation applications (e.g., utilizing resources from the cloud), or video or audio streaming applications, to name a few.

In certain scenarios, achieving low end-to-end latency for an application (e.g., low latency application) relies on network devices supporting low latency service throughout the communication path. However, distinguishing between different types of applications, e.g., low latency and non-low latency applications, can be challenging. For example, in monitoring information from data flows, packet header fields of data packets may lack reliable information about application types or priority levels to determine whether to provide low latency service. In another example, for network equipment owned or managed by a client, the network operator may lack information regarding the network equipment support for low latency services, such as support for resource reservation for latency-sensitive data flows.

The present disclosure is directed toward systems and methods for profiling low latency applications using telemetry. The systems and methods of the technical solution discussed herein can take one or more actions according to the type of application. For example, the system can collect telemetry information for individual data flows. The data flows can be associated with an application executed on at least one device. Packets in individual data flows can be identified or defined by predetermined or configured types of information associated with one or more fields within the packets, such as but not limited to a 5-tuple from the header of the data packets. The 5-tuple can include a source internet protocol (IP) address, destination IP address, source port number, destination port number, and network protocol used for sending the respective data flows. The network protocol can include at least one of transmission control protocol (TCP), user datagram protocol (UDP), internet control message protocol (ICMP), etc.

With the 5-tuple (or other types of information), the system can determine whether the data flow is an existing flow or a new flow. A flow can include or refer to a sequence of packets with certain shared characteristics or attributes and may be treated as a single entity. The flow can represent the data communication between two endpoints, such as a source and a destination, across the network, which can be defined by various attributes, including but not limited to source and destination IP addresses, source and destination ports, protocol type (e.g., TCP, UDP), or other packet header fields. The flow can encapsulate the data exchange between at least two network entities over a time period, which can represent a communication session or data transfer activity. For example, the system can search a database using the 5-tuple of the one or more packets to determine whether the data flow corresponds to an existing data flow according to whether the 5-tuple matches at least one entry. If the flow is an existing flow, the system can update a counter associated with an existing flow as part of generating telemetry data. Otherwise, if the flow is a new flow, the system can learn the new flow, for instance, by adding information (e.g., the 5-tuple) associated with the new flow in the database for subsequent generation of telemetry data. Although 5-tuple is used for purposes of providing examples, it should be noted that more or less number of tuples can be utilized to perform the features or operations discussed herein. The system can utilize the counter for a specific flow to generate the telemetry data including at least one of but not limited to bandwidth, average packet length, or average inter-arrival time, among others. The system can periodically compute one or more variances using the telemetry data to profile the one or more flows. Profiling the one or more flows can refer to analyzing whether the one or more flows include characteristics, fingerprints, or profiles of latency-sensitive flow or latency-insensitive (or non-latency-sensitive) flow, such as relatively constant bit rate streams, relatively constant packet sizes, relatively constant average inter-arrival time, etc., according to the variances of the telemetry data. In other words, the system can profile for constant bit rate flows, which may be considered as flows with relatively minimal variances or standard deviations or having standard deviations of the telemetry data within or below a threshold (e.g., 5%, 1%, or 0.5%). In response to profiling the one or more flows, the system can determine whether the application is a low latency application or other types of applications (e.g., non-low latency application) according to the consistency and stability of the data transmission rates, among other factors discussed herein. Thus, the system can execute or take one or more predefined actions according to or based on the type of application, thereby ensuring a desired QoS and preventing packet loss for the profiled flows.

Figure 3:
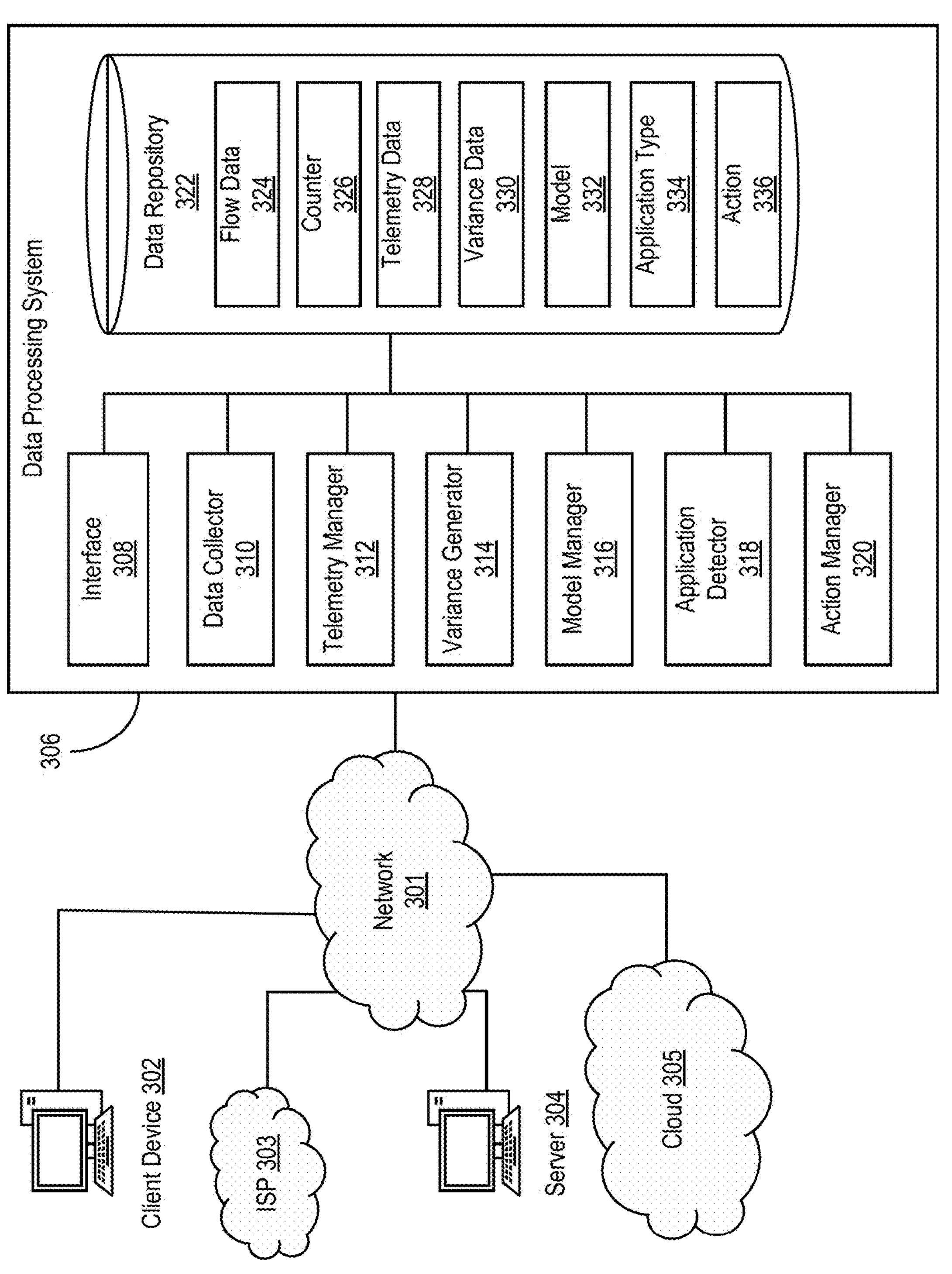
FIG. 3 is a block diagram of an example system to profile low latency applications using telemetry, in accordance with one or more implementations.

FIG. 3 depicts a block diagram of one embodiment of a system 300 for profiling low latency applications using telemetry. The system 300 can include at least one network 301, at least one client device 302, at least one internet service provider (ISP) 303, at least one server 304, at least one cloud 305 (e.g., cloud network or cloud computing device), and at least one data processing system 306 ("DPS"). These elements can be referred to generally as one or more components, elements, entities, or devices of the system 300. The system 300 can utilize the features and functionalities of one or more components to perform at least one of monitoring network data flows (e.g., sometimes referred to generally as flows), processing data packets, obtaining telemetry data, determining different types of applications, or performing one or more actions according to the type of application. Each component can receive, transfer, or otherwise communicate information with other components of the system 300 via the network 301. The data processing system 306 can correspond to or be referred to as a computing device, an intermediary device, a network device, or a profiling system.

In some implementations, the data processing system 306 can include, correspond to, or be a part of at least one other component of the system 300, such as a part of the client device 302, the ISP 303, the server 304, the cloud 305, or other devices within the network 301. In some other implementations, the data processing system 306 can be a different component or an independent component from the client device 302, the ISP 303, the server 304, and the cloud 305. In some configurations, the data processing system 306 can include or correspond to a switch intermediate between network devices exchanging data packets, for example.

In some implementations, one or more components of the system 300 can include, correspond to, or be in communication with one or more components of the communication system 100, as described in conjunction with at least one of FIGS. 1A-F. For example, the server 304 can include or correspond to the latency server 1005. In another example, an application detector (e.g., application detector 318) of the data processing system 306 can include or correspond to at least one of the latency applications 1004A, 1056A, 1056B, 1058A, 1058B, etc. In further examples, a data collector (e.g., data collector 310) of the data processing system 306 can be in communication with the latency server 1005 to collect or generate telemetry data using data from the latency server 1005, e.g., the latency server 1005 can monitor and communicate the telemetry data to the data processing system 306 (e.g., received via interface 308 of the data processing system 306). The one or more components of the system 300 can include, correspond to, or be in communication with other components of the communication system 100, such as the ISP infrastructure 1006A or 1006B corresponding to the ISP 303, the cloud infrastructure 1004 corresponding to the cloud 305, or the user device 1022, 1032 or television 1036 corresponding to the client device 302, for example. The one or more components of the system 300 may include or exhibit features or functionalities similar to the corresponding one or more components of the communication system 100.

The one or more components (e.g., client device 302, ISP 303, server 304, cloud 305, or data processing system 306) discussed herein can include or be implemented in hardware, or a combination of hardware and software, in one or more embodiments. Each component of the system 300 may be implemented using hardware or a combination of hardware or software detailed above in connection with at least one of FIGS. 1A-F and 2A-B. For instance, each of these components can include any application, program, library, script, task, service, process, or any type and form of executable instructions executing on the hardware of the respective component to perform the features, functionalities, or operations discussed herein. The hardware includes circuitry such as one or more processors in one or more embodiments.

The network 301 can include computer networks such as the Internet, local, wide, metro or other area networks, intranets, satellite networks, other computer networks such as voice or data mobile phone communication networks, and combinations thereof. The components of the system 300 can communicate with each other via the network 301, for example, the data processing system 306 can communicate with at least one of the client device 302, ISP 303, server 304, or cloud 305. The network 301 may be any form of computer network that can relay information between the network devices or components within the system 300, amongst others. In some implementations, the network 301 may include the Internet and/or other types of data networks, such as a local area network (LAN), a wide area network (WAN), a cellular network, a satellite network, or other types of data networks. The network 301 may also include any number of computing devices (e.g., computers, servers, routers, network switches, etc.) that are configured to receive and/or transmit data within the network 301. The network 301 may further include any number of hardwired and/or wireless connections. Any or all of the computing devices described herein (e.g., client device 302, ISP 303, server 304, cloud 305, data processing system 306, etc.) may communicate wirelessly (e.g., via WiFi, cellular, radio, etc.) with a transceiver that is hardwired (e.g., via a fiber optic cable, a CAT5 cable, etc.) to other computing devices in the network 301. Any or all of the computing devices described herein (e.g., client device 302, ISP 303, server 304, cloud 305, data processing system 306, etc.) may also communicate wirelessly with the computing devices of the network 301 via a proxy device (e.g., a router, network switch, or gateway).

The system 300 can include one or more client devices 302 communicatively coupled to the network 301. Each of the client devices 302 can include at least one processor and a memory, e.g., a processing circuit. The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 302 can include or correspond to one or more computing devices or network devices that can perform various functions as described herein. The one or more client devices 302 can include any or all of the components and perform any or all of the functions of at least one of the user/client devices 1022, 1032, 2062 described herein in conjunction with at least one of but not limited to FIGS. 1A-2B. In some cases, the one or more client devices 302 may include or correspond to the user/client devices 1022, 1032, 2062, such as described in conjunction with at least one of FIGS. 1A-2C. The one or more client devices 302 may include other devices associated with a residence, such as the modem 1020, 1030, set top box 1036, game controller 1038, or other devices of at least one residence 1018A, 1018B described in conjunction with at least one of FIGS. 1A-F.

Each client device 302 can include, but is not limited to, a television device, a mobile device, smart phone, personal computer, a laptop, a gaming device, a kiosk, or any other type of computing device. Each client device 302 can be implemented using hardware or a combination of software and hardware. Each client device 302 can include or be installed with one or more applications. The one or more applications can be managed or hosted by a third-party entity or a remote device, such as by the server 304 or the cloud 305. The one or more applications may be executed by the respective client device 302 to establish a communication session or allow the exchange of data with one or more network devices via the network 301, e.g., communication with the ISP 303, the server 304, the cloud 305, or the data processing system 306, among other components of the system 300.

Each client device 302 can include a display device that can provide visual information, such as information presented as a result of executing instructions stored in the memory of the client device 302. The display device can include a liquid-crystal display (LCD) device, an organic light-emitting diode (OLED) display, a light-emitting diode (LED) display, a bi-stable display (e.g., e-ink, etc.), amongst others. The display device can present one or more user interfaces to on various regions of the display in accordance with the implementations described herein. In some implementations, the display device can include interactive elements, such as a capacitive or resistive touch sensors. Thus, the display device can be an interactive display (e.g., a touchscreen, a display, etc.), and can include one or more input/output (I/O) devices or interfaces. Each client device 302 can further include or be in communication with (e.g., via a communications bus coupled to the processors of the client devices 302, etc.) one or more input devices, such as a mouse, a keyboard, or digital keypad, among others. The display can be used to present one or more applications as described herein, such as web browsers, emails, social network applications, video or audio streams, VR or AR simulations, gaming applications, etc. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 302. The interactions can result in interaction data, which can be stored and transmitted by the processing circuitry of the client device 302 to other computing devices, such as those in communication with the client devices 302. The interaction data can include, for example, interaction coordinates, an interaction type (e.g., click, swipe, scroll, tap, etc.), and an indication of an actionable object with which the interaction occurred. Thus, each client device 302 can allow/enable a user to interact with and/or select one or more actionable objects presented as part of graphical user interfaces to carry out various functionalities as described herein.

The system 300 can include at least one ISP 303. The ISP 303 can correspond to or include one or more devices controlled by companies providing internet service to individuals and businesses. The ISP 303 can include at least one processor and a memory, such as described in conjunction with the processor and memory of the client device 302, among other devices within the system 300. The ISP 303 can include any or all of the components and perform any or all of the functions of at least one of the ISP infrastructures 1006A, 1006B described herein in conjunction with at least one of but not limited to FIGS. 1A-F. In some cases, the ISP 303 may correspond to at least one of the ISP infrastructures 1006A, 1006B, such as described in conjunction with at least one of FIGS. 1A-F, for example.

The ISP 303 can include or be composed of hardware, software, or a combination of hardware and software components. The ISP 303 can include or correspond to at least one device, such as but not limited to data centers, routers, switches, coaxial cables, fiber optic cables, routers, gateways, or other networking equipment. The ISP 303 can be an intermediary device between one or more devices within the network 301 such as between the client device 302 and the cloud 305, for example. The ISP 303 can operate or serve as a gateway between the one or more client devices 302 and external network resources, such as the cloud 305.

The ISP 303 can facilitate communication by providing connectivity to between the network devices. For example, when an application executing on the client device 302 sends a request to access or communicate with at least the cloud 305 (e.g., the cloud service), the ISP 303 can route or forward the request from the client device 302 to the corresponding destination through the network infrastructure (e.g., via the network 301). The destination can be indicated in the data packets of the data flows. In another example, the ISP 303 can route data transmission from the cloud 305 to the one or more client devices 302 according to the destination of the data flows. The ISP 303 can manage the data transmission by executing at least one load balancing technique, maintaining QoS, implementing traffic shaping techniques (e.g., regulating data transmission rate) to prioritize certain data flows (e.g., critical or high-priority data flows), filtering packets, performing error detection or correction, etc. The ISP 303 can perform other features or functionalities not limited to those discussed herein to ensure the successful exchange of information between network devices.

In some arrangements, the system 300 can include multiple ISPs 303. Each ISP 303 can provide network services to a respective group of client devices 302. For example, a first ISP can facilitate communication between a first group of client devices 302 and at least the server 304. A second ISP can facilitate communication between a second group of client devices 302 and at least the server 304 (or other servers). In various implementations, the ISP 303 can provide features or functionalities as described in conjunction with at least one of but not limited to the ISP infrastructure 1006A or 1006B.

The system 300 can include one or more servers 304. The one or more servers 304 can include, correspond to, or be a part of at least one of the servers 1005, 1012A, 1012B, such as described in conjunction with at least FIGS. 1A-F. For example, the server 304 can be a computing device, including one or more processors and memory. The server 304 can be composed of hardware, software, or a combination of hardware and software components. The server 304 can deliver various services to the client devices 302 for the ISP in some embodiments. The server 304 can be configured as a central hub responsible for managing and routing internet traffic for its subscribers. The server 304 can handle requests from users such as accessing websites, sending emails, streaming content, and downloading files and manage network protocols, assign IP addresses, and facilitate communication between different devices on the internet (e.g., within the network 301).

In some implementations, the server 304 can include, correspond to, or be a part of the ISP 303 (e.g., operated by an ISP). For instance, the server 304 can employ traffic shaping and QoS mechanisms to prioritize and optimize internet traffic, ensuring a smooth and consistent user experience for all subscribers. These operations can involve managing bandwidth allocation, prioritizing certain types of traffic (e.g., VoIP or video streaming), and mitigating network congestion during peak usage periods and can be in response to information from another server (e.g., from server 1005). The server 304 can employ monitoring tools to continuously analyze traffic data to detect anomalies, troubleshoot network issues, and ensure compliance with service level agreements (SLAs) and regulatory requirements in some embodiments.

In some implementations, the server 304 (e.g., server 1005, similar to the server 1012A or 1012B) can manage data transmission for low latency applications or real-time applications. In this case, the server 304 can be referred to as a latency server, such as described in conjunction with the latency server 1005 of FIGS. 1A-F. The latency server (e.g., low latency server 1005) can include software advantageously configured to address latency issues through network optimization, infrastructure upgrades, and efficient routing to ensure a reliable and responsive internet experience for their customers in some embodiments. The latency server can receive logs of network activity, including but not limited to traffic patterns, usage statistics, and security events, from other servers (e.g., servers 1012A or 1012B) in some embodiments. The latency server can employ monitoring tools to continuously analyze traffic data to detect anomalies, troubleshoot network issues, and ensure compliance with SLAs and regulatory requirements in some embodiments. In some embodiments, the latency server can be a platform configured to perform latency monitoring in real-time, latency analysis in real-time, and latency optimization in real-time. In some embodiments, the latency optimization is performed to provide a report indicating latency issues.

In some implementations, the server 304 can be operated or managed by a service provider, such as an ISP for the client device (e.g., the ISP 303 may correspond to the server 304). In some other implementations, the server 304 can be an entity different from the ISP 303, configured to communicate with and provide resources to one or more applications executing on the client device 302 via the ISP 303, for example. In certain configurations, the server 304 can include, correspond to, or be a part of the cloud 305.

The system 300 can include at least one cloud 305. The cloud 305 can include at least one processor and a memory. The cloud 305 can be referred to as a cloud service, a cloud storage service, a third-party resource provider, or a resource distributor. The cloud 305 can include any or all of the components and perform any or all of the functions of at least the cloud infrastructure 1004 described herein in conjunction with at least one of but not limited to FIGS. 1A-F. In some cases, the cloud 305 may correspond to at least the cloud infrastructure 1004, such as described in conjunction with at least one of FIGS. 1A-F.

For example, the cloud 305 can include a collection of hardware, software, networking, and other resources that allow the delivery of cloud computing services over the internet in some embodiments. The cloud 305 can include physical servers, storage devices, networking equipment, and other hardware components hosted in data centers distributed across multiple geographic locations in some embodiments. The cloud 305 can be configured to provide high-speed, redundant network links, routers, switches, and content delivery networks (CDNs) for the delivery of low-latency, high-bandwidth content for users in some embodiments. The cloud 305 can include block storage (e.g., Amazon EBS, Azure Disk Storage), object storage (e.g., Amazon S3, Google Cloud Storage), and file storage (e.g., Amazon EFS, Azure Files) in some embodiments.

In some implementations, the cloud 305 can include or be a part of the server 304. For instance, the cloud 305 can include a remote data storage configured to store information for the server 304. The cloud 305 can provide access to the remote data storage for the server 304. The cloud 305 can be communicatively coupled to the one or more devices within the network 301. The cloud 305 can communicate with the client device 302 through the ISP 303. In some cases, the cloud 305 can provide the resources to the one or more applications executed on the client device 302 (or other client devices 302). In some cases, the components (e.g., client device 302, ISP 303, server 304, or cloud 305) of the system 300 can be in communication with the data processing system 306 via the network 301.

In various implementations, the one or more applications, such as discussed above, can be any type of application installed or executed on the network devices of the system 300, such as executed by the client device 302, the ISP 303, the server 304, the cloud 305, etc. An application can refer to software programs or services executing on at least one of the devices (e.g., client device 302, ISP 303, server 304, cloud 305, data processing system 306) within the network 301, which can allow an operator or user of the device to perform application specific tasks, such as sending messages, accessing websites, streaming audio or video content, executing a VR/AR simulations, etc. The application can utilize standardized protocols and data formats to package and transmit data over the network 301, such as from the cloud 305 to the ISP 303 and from the ISP 303 to the client device 302, or vice versa. In some implementations, the one or more applications can be managed or hosted by the server 304 or the cloud 305.

The application can include a browser application (e.g., web browsing application), a content streaming application (e.g., video and audio streams), a gaming application, or other non-limiting applications accessible by the network devices. Users or operators of the client device 302 can interact with the application to perform application-specific tasks, e.g., opening a web browser, starting content streaming, or initializing an application instance, among others. Responsive to the interaction, the application can generate data packets containing the necessary information and send the generated data packets over the network 301 to a desired destination. At the receiving end, a destination device (which may be executing the application) may interpret or process the data packets and perform one or more predefined actions according to the (aggregated) data packets, such as presenting contents to an end user or processing requests from the end user. For purposes of providing examples, the application can be low latency applications (e.g., latency-sensitive applications or real-time applications) or non-low latency applications.

Low latency applications can refer any application configured to deliver data or receive responses with minimal delay between the client device 302 and the cloud 305 (or server). Examples of low latency applications can provide various latency-sensitive functionalities such as but not limited to teleconference, video or audio stream, gaming, or virtual simulations, to name a few. Non-low latency applications can refer to any application that does not prioritize real-time interactions or may tolerate relatively longer delays between the client device 302 and the cloud 305. Examples of non-low latency applications can include non-latency-sensitive functionalities such as but not limited to email, document editing software, social media platforms, or file storage. For purposes of providing examples herein, the application executed by the client device 302 can be a low latency application or a non-low latency application, which can be analyzed, monitored, or detected by the data processing system 306.

Figure 4:
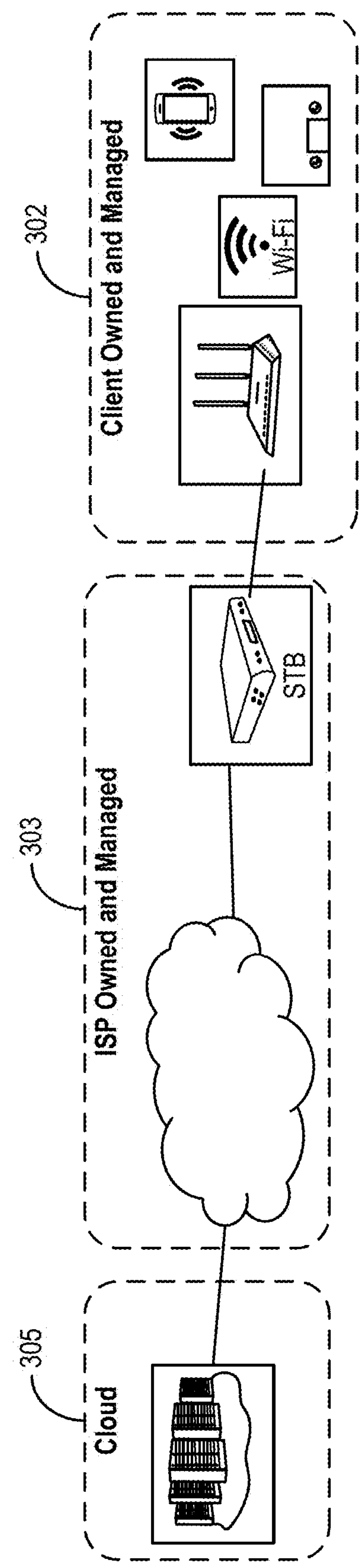
FIG. 4 is an example deployment of client-owned access point, in according with one or more implementations.
Figure 5:
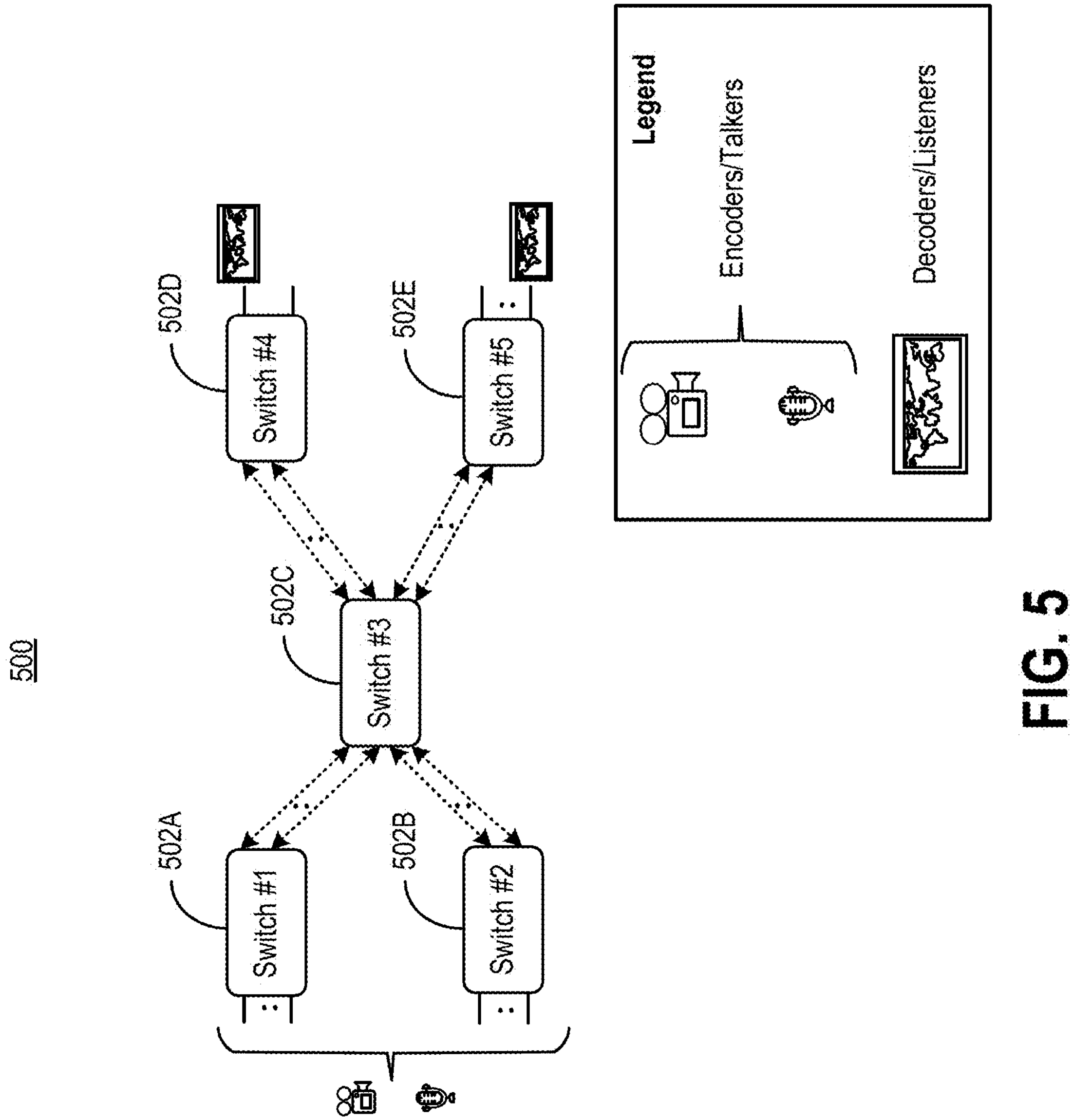
FIG. 5 is an example deployment of software-defined video over Ethernet (SDVoE) for audio-visual (AV) network, in according with one or more implementations.

The components of the system 300 can be deployed in different deployment scenarios, e.g., described in conjunction with but not limited to at least one of FIG. 4 or 5. For example, FIG. 4 illustrates an example deployment 400 of client-owned access point, in according with one or more implementations. The example deployment 400 includes the cloud 305 (or the server 304), the ISP 303 (e.g., devices of an ISP managing traffic from the client device 302), and the client device 302 (e.g., devices of a customer associated with a residence). The cloud 305 can be in communication with the ISP 303. The ISP 303 can be in communication with the client device 302. In some cases, the cloud 305 can be interchangeable with the server 304, such that the server 304 can communicate with the ISP 303 to perform the features or functionalities discussed herein.

For example, the client device 302 can deploy or execute an application to communicate with the cloud 305. The application of the client device 302 can transmit data packets (of one or more data flows) to the ISP 303 for relaying to the cloud 305. The data packets may include a request (e.g., for streaming service), input data (e.g., user interactions, such as key presses, interactive elements within the applications, etc.), or other types of information associated with the application or the client device 302. In response to receiving the data packets, the ISP 303 can route the data packets from the client device 302 to the cloud 305. The cloud 305 can process the data received from the ISP 303 to determine and perform application-specific tasks according to the received data. For example, for content streaming, teleconference, or gaming applications, the cloud 305 can respond with resources requested by the application. Such requested resources may include data uploaded by other client devices 302, such as video or audio data, etc.

In some cases, the cloud 305 may verify whether the client device 302 (e.g., the user of the client device 302) has access to the resources. The cloud 305 can provide at least a portion of the requested resources to the client device 302 according to the level of access associated with the user of the client device 302. The cloud 305 can provide a response or transmit the resources to the ISP 303. The ISP 303 can relay the resources to the client device 302. There may be one or more intermediary devices or servers between the cloud 305 and the ISP 303, such as one or more servers 304 configured to manage traffic to at least the ISP 303. In some implementations, the cloud 305 can transmit the resources, in response to the request from the client device 302, to at least one of the servers 304 depending on the type of application. For instance, the cloud 305 can receive an indication of an amount of traffic handled by the servers 304. According to the priority level of the request, the cloud 305 can send the resources (e.g., data flows) to the server 304 with more or less traffic or load, e.g., send high-priority data flows to servers 304 with relatively lower traffic (e.g., servers 304 configured to handle high-priority data flows) or low-priority data flows to servers 304 with relatively higher traffic. The cloud 305 can send data flows to the one or more servers 304 based on other factors, including but not limited to load balancing policies, network congestion, optimal paths, distances between the servers 304, etc., to handle different types of applications.

In the example deployment 400, the client device 302 can be owned and managed by the client, e.g., a customer-owned WiFi access point in a home network. The client device 302 may not be managed by a network operator (e.g., the ISP or an administrator). In some cases, the client device 302 may not support any resource reservation for latency-sensitive data flows. With the client device 302 not managed by the network operator, it may be difficult to determine whether an application is a latency-sensitive application. For instance, the client device 302 may not be configured or modified to identify low latency flows.

Figure 6:
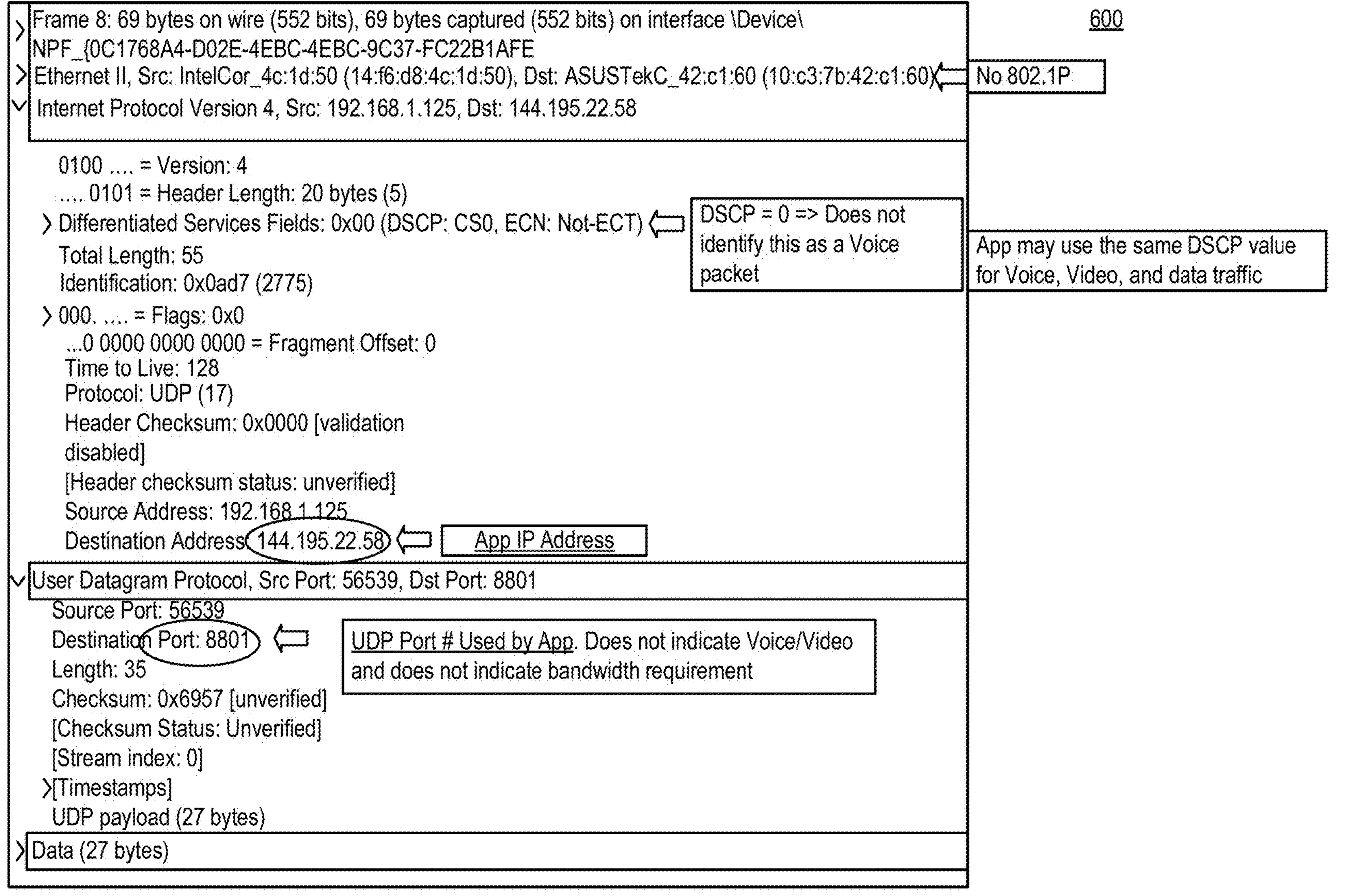
FIG. 6 illustrates example information from a voice flow of an application in the network, in according with one or more implementations.

In certain cases, the Dot1P (e.g., 802.1P) or differentiated service code point (DSCP) may not identify an application to be high priority or latency sensitive, or the Dot1P or the DSCP may be spoofed or re-marked, such that the application is not identified as high priority or latency sensitive. For example, referring to FIG. 6, depicted is example information from a voice flow 600 of/from an application in the network, in according with one or more implementations. The information of the voice flow 600 can be from a packet of a latency-sensitive flow (e.g., from a teleconference application monitored and captured in the network). As shown, the voice flow 600 may not include virtual local area network (VLAN) tag, hence no 802.1P information. Further, the UDP port number, presented in the voice flow 600 and used by the application, may not be an indication of AV traffic and may not indicate a bandwidth requirement. The example voice flow 600 includes DSCP of zero, which does not identify the packet as a voice packet. In such cases, the priority in the packet header shown in the example voice flow 600 may be categorized the same as other non-latency-sensitive (e.g., latency-insensitive) flows, in this example scenario.

Figure 7:
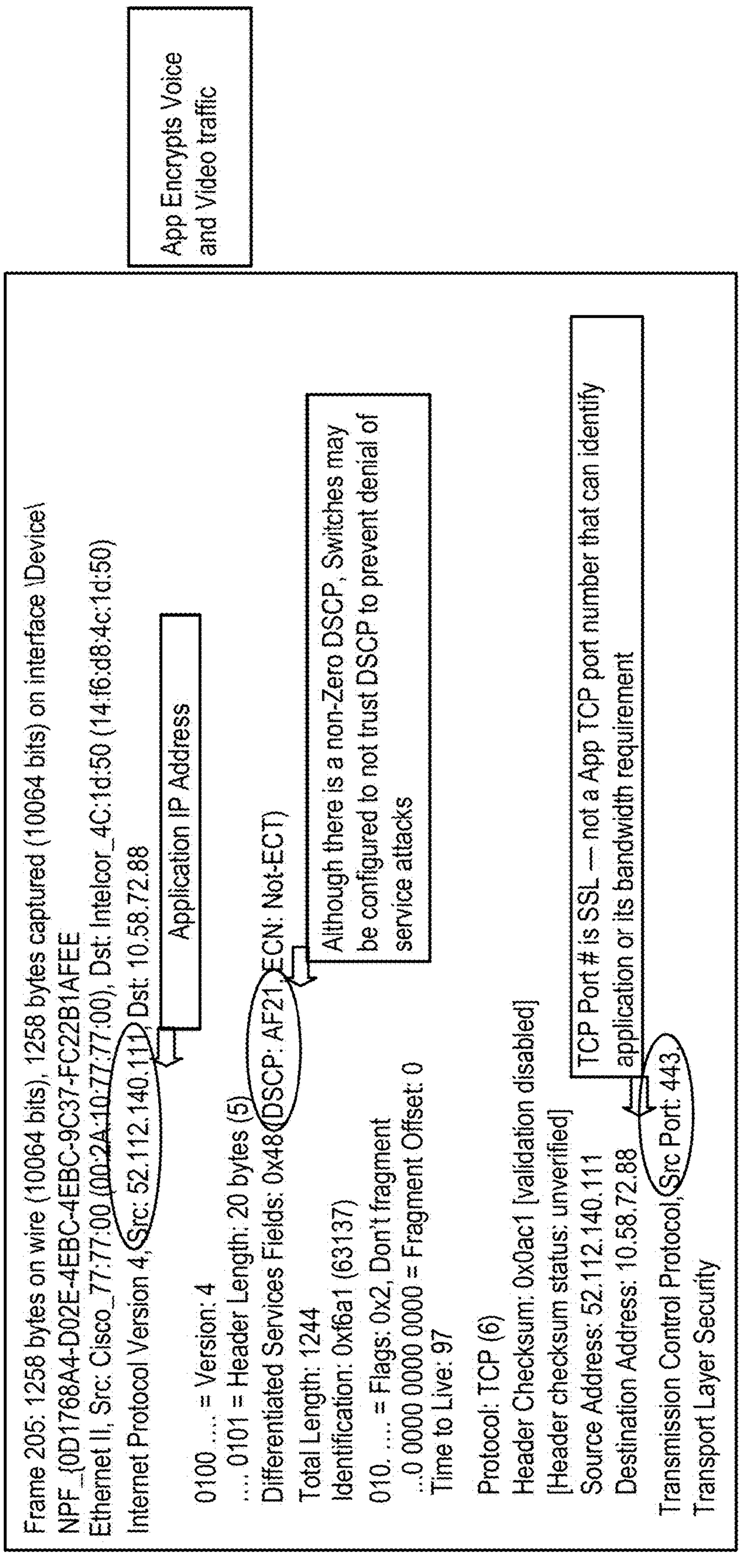
FIG. 7 illustrates example information from an encrypted traffic of an application in the network, in according with one or more implementations.

In certain aspects, the server 304, the cloud 305, or the data processing system 306 may not have access to layer 4 (L4) (TCP/UDP) port numbers (or other packet header fields) from the client device 302, or the data flow may be end-to-end encrypted by the cloud 305 (or the server 304) and the client device 302, as in this example scenario. For example, referring to FIG. 7, depicted is example information from an encrypted traffic 700 of an application in the network, in according with one or more implementations. The information of the traffic 700 can be from a packet of a latency-sensitive flow. The example information of the traffic 700 can represent an application-encrypted AV traffic from a data packet of the latency-sensitive flow. As shown, the traffic 700 includes at least an application IP address, TCP port number, and DSCP. The TCP or UDP port number in a low latency encrypted flow may be of secure sockets layer (SSL), and not published. As discussed above, there may be no VLAN tag (e.g., no 802.1P) and the DSCP may be zero. In such cases, according to the packet header, the priority of this data flow may be considered the same as other latency-insensitive flows.

In another deployment scenario, FIG. 5 illustrates an example deployment 500 of SDVoE for an AV network, in according with one or more implementations. In the example deployment 500, the SDVoE may lack support for multiple stream reservation protocol (MSRP). The SDVoE can refer to a technology designed for distributing high-quality audio and video signals over networks. The SDVoE can utilize the network infrastructure to transmit compressed or uncompressed video, audio, and control signals to the network devices.

The example deployment 500 can include a plurality of switches 502A-E (e.g., sometimes referred to as switch(es) 502). Each switch 502 can correspond to an SDVoE device, e.g., a transmitter or a receiver. The switch 502C can represent an Ethernet switch configured to relay information between the transmitters and receivers (e.g., switches 502A-B and 502D-E).

For purposes of providing examples, the switches 502A-B can be associated with the SDVoE transmitters (e.g., server 304 or cloud 305) and the switches 502D-E can be associated with the SDVoE receivers (e.g., client devices 302). It should be noted that there may be more or less number of switches 502. Each switch 502 can be connected to a respective computing device, e.g., the SDVoE transmitters coupled to encoders or talkers, and the SDVoE receivers coupled to decoders or listeners. For example, the SDVoE transmitter can be a device or endpoint that captures video and audio signals from various sources, such as cameras, computers, or media players. The SDVoE transmitter can encode audio and video signals for transmission over the networks. The Ethernet switch can provide the network infrastructure for transmitting these signals between devices within the AV network. The SDVoE receiver can be a device or endpoint that receives video and audio signals transmitted over the networks by the SDVoE transmitters. The SDVoE receiver can decode the received signals and output the decoded signals in a format compatible with the SDVoE receiver, such as display devices, speakers, etc.

In certain situations, the example deployment 500 may experience packet loss for high bandwidth video streams. For example, the switches 502 may not detect that the data flows are latency-sensitive (e.g., audio or video streams), e.g., to avoid load balancing because the bandwidth for the AV streams may not be guaranteed, resulting in link bandwidth oversubscription or packet loss. For instance, the switches 502 may reserve bandwidth for each AV flow (and load balance other non-latency-sensitive flows) by acquiring 5-tuple of the data flow and the bandwidth to reserve for the flow. To separate the flows, the present disclosure can determine or detect whether the flows are latency-sensitive and the type of application receiving (or transmitting) the flows.

In this example deployment scenario, the talkers, listeners, or switches 502 may lack support for a certain protocol, such as MSRP, to reserve network resources for audio-video bridging (AVB) flows. In some cases, the SDVoE may route audio independent of video by assigning separate high-priority queues and shaper. In some other cases, the switches 502 may not store historical information regarding the data flows (e.g., flow definition, bandwidth, or burstiness), and thereby may not support prioritization or shaping of traffic to ensure the QoS for AVB flows. In such example deployment scenarios, it may be difficult to prioritize certain data flows which may be from latency-sensitive applications. Hence, the present disclosure can provide systems and methods for detecting or identifying low latency applications using telemetry as discussed herein.

The system 300 can include at least one data processing system 306 for profiling low latency applications using telemetry data. The data processing system 306 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 306 can include one or more computing devices or servers that can perform various functions as described herein. The data processing system 306 can include any or all of the components and perform any or all of the functions of the computer 2001 described herein in conjunction with at least FIG. 2A.

In some configurations, the data processing system 306 can include components and perform any or all of the features and functionalities of at least one of the client device 302, the ISP 303, the server 304, the cloud 305, or other network devices within the network 301. In some configurations, the data processing system 306 can include, correspond to, or be a part of at least one network device, such as the ISP 303, the server 304, or the cloud 305. For example, the features or operations of the data processing system 306 for profiling low latency applications can be performed by the ISP 303, the server 304, or the cloud 305 for taking actions for latency-sensitive applications.

In some configurations, the data processing system 306 can be a separate entity or device from the client device 302, the ISP 303, the server 304, or the cloud 305. For example, the data processing system 306 can connect to the other devices and components of the system 300 via the network 301. For example, the data processing system 306 can receive instructions from the cloud 305 (or other network devices) to monitor data flows to or from the client device 302, e.g., between the client device 302 and the ISP 303, the server 304, or the cloud 305. As discussed herein, the data processing system 306 can determine the type of application executed on the client device 302 according to the monitored data (e.g., telemetry data/information). As part of the received instructions, the data processing system 306 can report the type of application to the ISP 303, the server 304, or the cloud 305 to take respective actions according to the type of application.

In some implementations, the data processing system 306 can delegate certain tasks to one or more other devices within the network 301, such as the ISP 303, the server 304, or the cloud 305. For example, the data processing system 306 can provide the monitored data flows to at least one other component within the system 300 to obtain telemetry data, determine variances based on the telemetry data, detect the type of application, or take action according to the type of application. For purposes of providing examples, the features or operations discussed herein can be performed locally on the data processing system 306, although it should be noted that the features or operations can be performed on other network devices, including but not limited to at least one of the ISP 303, server 304, or the cloud 305. Further, it should be noted that certain tasks discussed herein can be delegated to one or more other components within the system 300, not limited to local execution by the data processing system 306.

The data processing system 306 can include an interface 308. The interface 308 can transfer data between one or more components of the data processing system 306, such as data collector 310, telemetry manager 312, variance generator 314, model manager 316, application detector 318, action manager 320, and data repository 322. The interface 308 can include hardware, software, or a combination of hardware and software components to interface with the network 301, devices within the system 300 (e.g., network 301, client devices 302, ISP 303, server 304, or cloud 305), or components of the data processing system 306. The interface 308 can include features and functionalities similar to the communication interface 2018 to interface with the aforementioned components, such as in conjunction with FIG. 2A. For example, the interface 308 can include standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The interface 308 can include at least a built-in network adapter, network interface card, PCMCIA network card, EXPRESSCARD network card, card bus network adapter, wireless network adapter, USB network adapter, modem, or any other device suitable for interfacing one or more devices within the system 300 to any type of network capable of communication. The interface 308 can communicate with one or more aforementioned components to at least receive, transmit, or otherwise exchange data/information. The interface 308 can interact with other components or devices not limited to those discussed herein.

The data processing system 306 can include a data collector 310 to collect data received from one or more network devices or components in the network 301 (e.g., client device 302, ISP 303, server 304, or cloud 305). The data collector 310 can obtain or collect data packets of flows monitored between the client device 302 and the cloud 305. In some cases, the data collector 310 can collect a portion of information from the data packets, such as information from the header field of the data packets, and filter out other portions of the data packet. For example, the data collector 310 can collect the 5-tuple associated with each flow and other information associated with one or more packets of each flow, as discussed herein.

The data collector 310 may collect one or more packets of individual data flows. The data collector 310 may obtain the one or more packets periodically, e.g., receive a group of packets from the ISP 303, the server 304, or the cloud 305 at predefined intervals. The data collector 310 may receive individual packets of a flow in response to the packets being sent from the client device 302, the cloud 305, or other network devices. For instance, the data processing system 306 can be an intermediary device configured to monitor for packets of various flows as the flows are being transmitted between devices, e.g., similar or corresponding to the ISP 303. In another example, the data processing system 306 may be an edge/end device configured to receive the data flows, e.g., the server 304 or the cloud 305. The data collector 310 can store the collected data in the data repository 322. In some cases, the data collector 310 may temporarily store the collected data, and remove the temporarily stored data periodically or in response to taking an action for the data flow (e.g., performed by the action manager 320).

As discussed herein, low latency real-time applications (e.g., teleconference applications, broadcast or video from a TV station to televisions or client devices 302, etc.) can have different or separate data flows for different types of data, such as a respective flow for voice, video, management, control, and data. In some implementations, certain flows of the same application may be considered latency-sensitive flows and certain other flows may be considered non-latency-sensitive flows. These separate flows may be prioritized differently, for example. For purposes of providing examples herein, real-time AV flows (e.g., latency-sensitive flows) can be associated with low latency applications. Such low latency applications may have relatively constant bit rate streams, e.g., the bandwidth of the flow is relatively constant with relatively low bandwidth variation. Bandwidth variation can refer to changes in the bandwidth size or magnitude between different flows. For instance, the bandwidth for a voice flow may be around 15 Kbit/sec and the bandwidth for a video flow can be around 550 Kbit/sec, although other bandwidth sizes can be recorded for the latency-sensitive flows.

In some cases, the latency-sensitive flows can include relatively similar packet sizes, e.g., the packet length may not (substantially) change over time with relatively low packet length variation. Packet length variation can refer to changes to the packet length across different flows. For instance, the packet length or size of an average voice packet can be around 180 bytes, and the packet length of an average video packet can be around 1041 bytes, although other packet sizes can be recorded for the latency-sensitive flows. In some other cases, the audio and video captures may be packetized by encoders or talkers and transmitted at regular intervals. For latency-sensitive flows, the average inter-arrival time (IAT) (e.g., the time between the first bit of two consecutive packets received in the same flow) may not change over time or may be relatively similar over time, e.g., relatively low average IAT variation. For example, the average voice IAT may be around 110 ms, and the average video IAT may be around 15 ms, although other IAT can be recorded for the latency-sensitive flows. As such, the data collector 310 can obtain or collect information related to at least one of the bandwidth, the average packet length, and the average IAT of packets of individual flows, among other types of data for determining the type of application.

The data processing system 306 can include the telemetry manager 312 configured to generate or manage telemetry information/data for individual data flows. The telemetry manager 312 can collect per-flow telemetry in response to receiving each packet for a respective flow. Per-flow telemetry can refer to telemetry data associated with each flow. Telemetry data can refer to or be defined as the automatic process of the data created by a system (e.g., the data processing system 306) being remotely collected through the use of agents and protocols. The telemetry data may extend to and include various logs, metrics, events, or traces that are created or generated by one or more applications. For instance, the telemetry data may include information about network traffic, performance metrics, error rates, packet loss, latency, or other relevant parameters. The types of telemetry data to collect may be configured or predefined by the administrator of the data processing system 306. For purposes of providing examples herein, the types of telemetry data can include at least one of bandwidth, average packet length, or average IAT, although other types of telemetry data can be utilized for detecting the type of application, not limited to those discussed herein. The telemetry manager 312 can store the telemetry data in the data repository 322.

To obtain the telemetry data, the telemetry manager 312 can determine whether the received packet is for or belongs to an existing flow. For example, the telemetry manager 312 can perform a look-up or a search in the data repository 322 using the 5-tuple (or other information in the packet header fields) from the packet. The data repository 322 can store a plurality of historical tuples (e.g., 5-tuples) associated with flows historically recorded by the data processing system 306 (e.g., the telemetry manager 312) or retrieved by one or more other devices within the network 301. In some cases, one or more 5-tuples can be provided by at least one remote device, such as the server 304 or the cloud 305, for the data processing system 306 to monitor for low latency applications.

The telemetry manager 312 can compare the 5-tuple of the received packet to one or more entries in the data repository 322. A match between the 5-tuple to an entry within the data repository 322 (e.g., an entry includes or is associated with the 5-tuple) may indicate that the received packet is part of an existing flow. Responsive to a match, the telemetry manager 312 can determine that the packet received in the flow is eligible for telemetry collection. In some implementations, the telemetry manager 312 may perform telemetry data collection for any flow. In some other implementations, the telemetry manager 312 may perform telemetry data collection for flows with the source IP address or destination IP address. The telemetry manager 312 may collect the telemetry data for one or more flows with one or more packets that include certain predefined types of information, not limited to the IP addresses, and discard other packets absent of the predefined types of information.

Responsive to comparing the 5-tuple to entries of the data repository 322, the telemetry manager 312 can determine whether there is an existing flow entry (e.g., entry for a flow with the same 5-tuple). If there is an existing flow entry, the telemetry manager 312 can update one or more counters associated with the existing flow. Otherwise, if there is no entry in the data repository 322, the telemetry manager 312 can add the 5-tuple as part of a new entry in the data repository 322 to identify, track, and/or manage a new flow (e.g., sometimes referred to as learning a new flow for profiling the flow as latency-sensitive or latency-insensitive). The telemetry manager 312 can allocate or assign one or more counters for the new flow.

To generate or obtain the telemetry data, the telemetry manager 312 can use one or more counters to keep track or record information regarding the packet(s) within a flow. The telemetry manager 312 can store counters used for obtaining the telemetry data for individual flows in the data repository 322. Each counter can be used for a particular type of telemetry data for the respective flow. For example, a first counter can be used for determining the bandwidth, a second counter can be used for determining the average packet length, and a third counter can be used for determining the average IAT, etc.

Responsive to determining that the received packet is associated with an existing flow, the telemetry manager 312 can update one or more counters (e.g., flow analytic counters) and collect the counter values periodically (e.g., every 0.1 seconds, 0.2 seconds, or 0.5 seconds). The periodic intervals to collect the counter values can be predetermined or configured by the administrator of the data processing system 306. The collected counter values can be used to generate the telemetry data. In some cases, the collected counter values can represent certain types of telemetry data used for detecting the type of application (or the type of flow).

The telemetry data can include, but is not limited to, at least one of the bandwidth, the average packet length, or the average IAT of the flow. For obtaining the bandwidth, the telemetry manager 312 can add the packet length (L) to a counter (C1) (e.g., sometimes referred to as a byte counter) reserved for measuring the bandwidth of the flow. As the telemetry manager 312 receives new packets associated with the flow, the telemetry manager 312 can iteratively add the packet lengths of the new packets to the counter C1, e.g., C1=C1+L. The telemetry manager 312 can read the counter value from the data repository 322 periodically and export the counter value to compute the bandwidth. With the counter value, the telemetry manager 312 can use the formula $$\frac{C1 \times 8}{T}$$

to generate the bandwidth for the flow. The period (T) can be predetermined. The value 8 can represent the number of bits per byte. The telemetry manager 312 can store the bandwidth in the data repository 322.

The telemetry manager 312 can generate an average packet length using multiple techniques or formulas. The telemetry manager 312 can use a counter (C2) to obtain the average packet length. For example, responsive to receiving a packet, the telemetry manager 312, the telemetry manager 312 can update the average packet length in the counter C2 according to the following formula:

$$C2 = C2 \times \left(\frac{(2^n - 1)}{2^n}\right) + L \times \left(\frac{1}{2^n}\right) = (C2 - (C2 \gg n)) + (L \gg n),$$

where n is greater than zero. For example, for n=7, the result of the counter C2 can be C2=(C2−(C2»7))+(L»7), where L is the length of the current packet (e.g., the most recently received packet). The telemetry manager 312 can collect the counter value (C2) periodically, e.g., every T seconds. The telemetry manager 312 can periodically poll C2 or packetize C2 for processing. The telemetry manager 312 can export or output the counter value C2 as the average packet length.

In another example, the telemetry manager 312 can increment the number of packets received using the counter C2. For example, in response to receiving each packet for the flow, the telemetry manager 312 can increment C2 by one, e.g., C2=C2+1. The telemetry manager 312 can collect (e.g., read or export from the data repository 322) the counter value C2 periodically, e.g., every T seconds. The telemetry manager 312 can compute the average packet size in the interval T using the formula $$\frac{C1}{C2}.$$

In other words, in this example, the average packet size is equal to the total packet length (e.g., according to the byte counter used for bandwidth generation or estimation) divided by the number of packets received within the interval T.

The telemetry manager 312 can compute a current IAT using the following formula: Current IAT=(T1−T2), where T1 is the arrival time of the first bit of the current packet, and T2 is a stored value of the time when the first bit of the previous packet in the same flow was received. In other words, the current IAT can represent the time difference between the reception of the most recent packet and the second most recent packet. The telemetry manager 312 can compute a moving average of IAT in a counter (C3). For example, the telemetry manager 312 can compute the moving average of IAT using the following formula:

$$C3 = C3 \times \left(\frac{(2^n - 1)}{2^n}\right) + IAT \times \left(\frac{1}{2^n}\right) = (C3 - (C3 \gg n)) + (IAT \gg n),$$

where n is greater than zero. For example, if n=5, C3=(C3−(C3»5))+(IAT»5). In this case, the IAT can be the current IAT, and C3 can represent the average IAT updated over the interval T. The telemetry manager 312 can update and store T2=T1 in response to determining the current IAT or updating the counter C3, e.g., to prepare for computing the next current IAT responsive to receiving a new packet for the flow.

The telemetry manager 312 can provide the telemetry data to the variance generator 314 or other components of the data processing system 306. The telemetry manager 312 may generate or obtain other types of telemetry data/information, not limited to the bandwidth, average packet length, or average IAT of the flow.

In some implementations, the telemetry manager 312 may receive telemetry data from one or more remote devices. For example, the telemetry manager 312 can delegate the telemetry data generation task to the one or more remote devices. The one or more remote devices can generate the telemetry data in response to receiving one or more packets for each data flow. The one or more remote devices can send the generated telemetry data to the data processing system 306. The telemetry manager 312 can receive the telemetry data from the one or more remote devices via the interface 308. In some cases, the telemetry manager 312 may access remote data storage (e.g., of the server 304 or the cloud 305) to obtain the telemetry data. In some implementations, the changes or values of the types of telemetry data over time can represent the signature, pattern, or profile of the telemetry data. The signature or pattern of the telemetry data may be used to determine the variances discussed herein.

The variance generator 314 can generate one or more variances of the (real-time) telemetry data obtained periodically (e.g., every T seconds). The variance can refer to the dispersion or spread of a set of data points. For example, the variance can represent the difference between at least two measurements or values, between at least a value and a certain function, statistic, or metric, or between at least two states, metrics, or functions. In another example, the variance of the telemetry data can represent or measure how much the data points of the telemetry data deviate from an average or mean value. The variances can include at least one of a variance of bandwidth, a variance of packet lengths, or a variance of IAT, among other variances associated with the telemetry data. The variance generator 314 can compute the variances of or using the telemetry data over multiple intervals of collecting the telemetry data to compute the one or more variances. The variance generator 314 can use any suitable variance computation technique or variance formula to compute the one or more variances of the telemetry data. The variance generator 314 can store the generated variances in the data repository 322. It should be noted that more or less numbers of variances can be obtained for profiling individual flows.

The spread or variability of the data points associated with the telemetry data for computing the variances can represent the signature, pattern, or profile of the variances. In some implementations, the one or more variances of the bandwidth, packet length, or IAT can correspond to or refer to the signature of the bandwidth, packet length, or IAT, respectively. In some cases, a signature or pattern of the variances can represent the values of the plurality of variances for the flows, such that the signature represents the combination of the bandwidth variance, the packet length variance, or the IAT variance for the flow.

The application detector 318 can profile constant bit rate (CBR) flows. Profiling constant bit rate flows can refer to or involve monitoring or analyzing the characteristics, behaviors, patterns, or otherwise the profiles or the flows. The application detector 318 can profile the CBR flows according to the one or more variances of the telemetry data from the variance generator 314. For example, the application detector 318 can compare at least one of the variances (e.g., bandwidth variance, packet length variance, or IAT variance) to a predetermined threshold (e.g., sometimes referred to as a standard deviation threshold). The predetermined threshold may be 1% standard deviation, 2% standard deviation, or 5% standard deviation, for example. The threshold can be configured by the administrator of the data processing system 306 or the network operator.

Responsive to the comparison, the application detector 318 can determine whether the flow is latency-sensitive or latency-insensitive. For example, if the flow has at least one of the bandwidth, packet lengths, or IAT that is at, below, or within the threshold (e.g., within the 1% standard deviation) based on the respective variances, the application detector 318 can determine that the flow is latency sensitive. In this case, the application detector 318 can determine that the application for the flow (e.g., the application executed on the client device 302) is a low latency application according to the signature or profile of at least one of the variances. Otherwise, if at least one of the variances is greater than the threshold (or outside the threshold), the application detector 318 can determine that the flow is latency-insensitive, which is associated with a non-latency sensitive application.

The application detector 318 can store the indication that the flow is associated with the determined type of application (e.g., low latency or non-low latency application) in the data repository 322. For instance, the application detector 318 can store an indication that the 5-tuple representing the flow is associated with the determined type of application. In such cases, any subsequent packets or flows with the same 5-tuple can be considered a low latency application or non-low latency application. In some cases, the application detector 318 may discard the stored indication at the end of the communication session between the application and the cloud 305 (or the server 304), because of the changes to the 5-tuple.

In some implementations, the application detector 318 can utilize a model to detect the type of application or the type of flow. For example, the data processing system 306 can include a model manager 316 configured to generate, train, update, or otherwise manage one or more models. The mode can be referred to as a machine learning (ML) model or an artificial intelligence (AI) model. The model manager 316 can train the one or more models using at least one suitable machine learning technique. The machine learning technique can include but is not limited to supervised learning, unsupervised learning, reinforcement learning, transfer learning, etc. The model can include or correspond to a convolutional neural network (CNN) model, long-short-term-memory (LSTM) model, support vector machine (SVM), or other types of models. In some cases, the model manager 316 may use a combination of different types of models. The model manager 316 can receive or obtain training data for training the model. The model manager 316 may receive a model generated or trained by other devices within the network 301, such as trained by the server 304, the cloud 305, or in some cases, locally on the client device 302.

The model manager 316 can store the models in the data repository 322. The model manager 316 can manage a plurality of models. Each model may be configured to perform a certain feature, such as at least one of but not limited to learning the signature of the telemetry data or the signature the variances of the telemetry data. The model manager 316 may update the model based on data (e.g., data stream) during the deployment of the model, e.g., updated in relatively real-time or responsive to receiving a new (training) dataset. For purposes of providing examples, the model manager 316 may generate, train, or use a model of a plurality of models. The model manager 316 may select a model from the plurality of models for detecting the type of application.

For example, the model manager 316 can provide training data to the model, including at least one of historical telemetry data, historical variances, or historical signatures associated with known applications. The known application may include a plurality of low latency applications (e.g., teleconference application, gaming application, or VR/AR simulation application) and a plurality of non-low latency applications (e.g., web browsing application, email application, or file storage application). The model manager 316 can train the model to recognize signatures of the telemetry data or the variances of the telemetry data that represent a low latency application (e.g., latency-sensitive type). In some cases, the model manager 316 may train the model to recognize signatures of the telemetry data or the variances of the telemetry data that represent non-low latency applications (e.g., other types of applications).

The model manager 316 can iteratively train the model with new training datasets. The new training datasets may include at least one of but not limited to the telemetry data (e.g., generated by the telemetry manager 312), the variances (e.g., computed by the variance generator 314), the type of application determined by the application detector 318 using the model (e.g., latest version of the model), or an indication regarding whether the determined type of application is accurate (e.g., true or false determination by the application detector 318 using the model). According to the new training dataset, the model can update or readjust the signatures representative of low latency applications and non-low latency applications, thereby improving the accuracy of the detection for latency-sensitive data flows and low latency applications. In some implementations, the updating the model can include generating a new version of the model or creating a new model according to at least the new training datasets.

In some implementations, the application detector 318 can use the model trained with machine learning to match the (current) signature of the flow (e.g., signature of the telemetry data or variances) with historical signatures of known applications. For purposes of providing examples, the historical signatures can be associated with latency-sensitive applications. If the current signature matches at least one of the historical signatures associated with at least one low latency application, the application detector 318 can determine that the flow is from low latency application (e.g., the same or different low latency application as those used for the training procedures of the model). Otherwise, if the current signature does not match any of the historical signatures, the application detector 318 can determine that the flow is from other types of applications (e.g., at least one non-low latency application).

The data processing system 306 can include the action manager 320 configured to take one or more actions responsive to profiling the flow to associate with a type of application. The one or more actions can be taken to guarantee, ensure, or provide QoS and prevent packet loss for the profiled flows. Providing QoS can include prioritizing and managing network resources to ensure that the flow receives the necessary level of service or performance according to the flow requirement, which can involve mechanisms and techniques to control factors such as bandwidth, latency, jitter, and packet loss. Certain techniques to provide QoS for the flow can include but are not limited to at least one of traffic prioritization, traffic shaping, packet queuing bandwidth reservation, or admission control, for example. The one or more actions can be predefined and stored in the data repository 322. In some cases, the action manager 320 may receive instructions from one or more remote devices within the network 301 indicating one or more actions to take according to different types of applications, e.g., taking a first action for a low latency application and taking a second action for a non-low latency application.

In some cases, the action manager 320 can take, execute, or perform the one or more actions, e.g., to provide QoS for the flow, according to the type of application. In some other cases, the action manager 320 may send instructions to one or more remote devices within the network 301, such as the ISP 303, server 304, or cloud 305, to take the one or more actions. In some configurations, the action manager 320 can send an indication of the type of application associated with the flow to the one or more remote devices to determine and take the one or more actions.

An example action to take to provide the QoS for the flow can include assigning a link in a lag bundle as a destination port for latency-sensitive flows. In this case, the link can receive the latency-sensitive flows designated for a certain network device or service. Load balancing can be performed for other types of traffic, e.g., latency-insensitive flows or flows from other types of applications. Another example action can include assigning a higher traffic class and storing the latency-sensitive flows (e.g., voice and video flows) into high-priority queues to ensure lower latency. Assigning the higher traffic class may involve configuring one or more network devices, such as routers, switches, or QoS mechanisms, to prioritize certain types of traffic over others. In this case, the latency-sensitive flows can be prioritized over other types of flows.

In another example, an action may involve using audio video bridging (AVB) shapers to reduce the burstiness of the AV flows. The AVB shapers may be network components or features designed to enforce bandwidth and latency requirements for AVB traffic within an AVB-enabled network. The AVB can include a set of standards that allows for a reliable and time-synchronized transmission of audio and video streams over Ethernet networks. The AVB shapers can ensure that AVB traffic adheres to the specific timing and QoS parameters defined by the AVB standards, for example.

In further examples, an action may involve shaping low latency flows to reduce burstiness in downstream networks. Shaping the low latency flows can include a process of controlling the rate or pattern of data transmission within a network by regulating the flow of packets according to predetermined criteria or policies. The shaping of the flows can ensure that the flows conform to predetermined parameters, such as bandwidth limits, latency requirements, or QoS standards, to name a few.

In yet another example, an action may involve using one or more buffer and traffic management policies for all other flows that do not match the profile of the latency-sensitive flows. This action may be performed for latency-insensitive flows, e.g., for flows with a signature that does not match with the historical signatures or with at least one of the variances being greater than the predetermined standard deviation threshold, for example. The action manager 320 can select and execute other actions not limited to those discussed herein.

In some implementations, the data processing system 306 can perform other features and functionalities using the components described above to at least obtain the telemetry data, generate the variances, detect the type of application, or take action according to the type of application. The data processing system 306 may include additional components configured to perform the features or functionalities discussed herein. In some cases, the one or more components (e.g., interface 308, data collector 310, telemetry manager 312, variance generator 314, model manager 316, application detector 318, or action manager 320) of the data processing system 306 may be combined or a part of a single component, for example. In some other cases, each of the components of the data processing system 306 may include multiple devices, circuits, or components configured to perform individual features to detect the application type and take action, among others.

The data repository 322 can include at least a flow data storage 324, counter storage 326, telemetry data storage 328, variance data storage 330, model storage 332, application type storage 334, and action storage 336. The data repository 322 can include data stored in at least one remote storage device (e.g., data stored on the server 304 or cloud 305). In some cases, the data processing system 306 can relocate or transfer data between the data repository 322 and the remote storage device. In this case, the data processing system 306 can access data from the remote storage device. The data repository 322 can be referred to as the memory of the data processing system 306, for example. The data repository 322 can be accessed by one or more components within the data processing system 306 (e.g., interface 308, data collector 310, telemetry manager 312, variance generator 314, model manager 316, application detector 318, or action manager 320). The data repository 322 can be accessed by other devices within the network 301, such as the ISP 303, the server 304, or the cloud 305.

The flow data storage 324 can include, store, or maintain data packets or information associated with the flows communicated by one or more applications executed by the at least one of the network devices. For example, the flow data storage 324 can store data packets of various flows, header fields of the packets, 5-tuples from the packets, etc. The flow data storage 324 can store other data utilized or stored by the data collector 310 or received by the interface 308, for example.

The counter storage 326 can include, store, or maintain the counters associated with each flow. For example, the counter storage 326 can store one or more counters for computing or generating the telemetry data. The counter storage 326 can be accessed by at least the telemetry manager 312. The counters stored in the counter storage 326 can be updated by the telemetry manager 312. The counter storage 326 may reset or remove one or more counters of certain flows after a predetermined time, after a communication session for an application is disconnected, or in response to receiving an instruction to clear or reset the counter values from the administrator of the data processing system 306. The counter storage 326 can include other information utilized by the telemetry manager 312 to generate the telemetry data.

The telemetry data storage 328 can include, store, or maintain the telemetry data. The telemetry data storage 328 can be accessed by the telemetry manager 312 to store, retrieve, or access the telemetry data. The telemetry data storage 328 can group the telemetry data for individual flows. The telemetry data storage 328 can be accessed by the variance generator 314 to generate the variances of the telemetry data. The telemetry data storage 328 can include historical telemetry data generated by the telemetry manager 312 or obtained from other remote devices.

The variance data storage 330 can include, store, or maintain the variance data including the one or more variances computed according to the telemetry data. The variance data storage 330 can be accessed by the variance generator 314 to store the generated variance data. The variance data storage 330 can be accessed by the model manager 316 or the application detector 318 to detect the type of application for the flow.

The model storage 332 can include, store, or maintain at least one model trained using machine learning. The model storage 332 can be accessed by the model manager 316 to store the generated model. The model stored in the model storage 332 can be trained or updated by the model manager 316. The model storage 332 can be accessed by the application detector 318 configured to use the trained model to detect or determine the type of application for the flow.

The application type storage 334 can include, store, or maintain various types of applications. The application type storage 334 can store information associated with the different applications (e.g., known applications). For example, the application type storage 334 can store an identifier representing known applications, such as certain teleconference applications, streaming applications, social media applications, web browsing applications, etc. The application type storage 334 can store a respective signature (or historical telemetry data or variance data) associated with each known application. The application type storage 334 may store an indication of various 5-tuples associated with the respective type of application. The application type storage 334 can store other information that may be linked to or associated with the type of application.

The action storage 336 can include, store, or maintain the one or more actions executable by the action manager 320 or other authorized remote devices. The action storage 336 can store other actions not limited to those discussed herein. The action storage 336 can be accessed by at least the action manager 320. The action storage 336 can receive updated actions, a new action, or an indication to remove at least one existing action. In some cases, the action storage 336 can include one or more actions configured to be performed by the remote device(s), such as actions for the ISP 303, the server 304, the cloud 305, etc.

Figure 8:
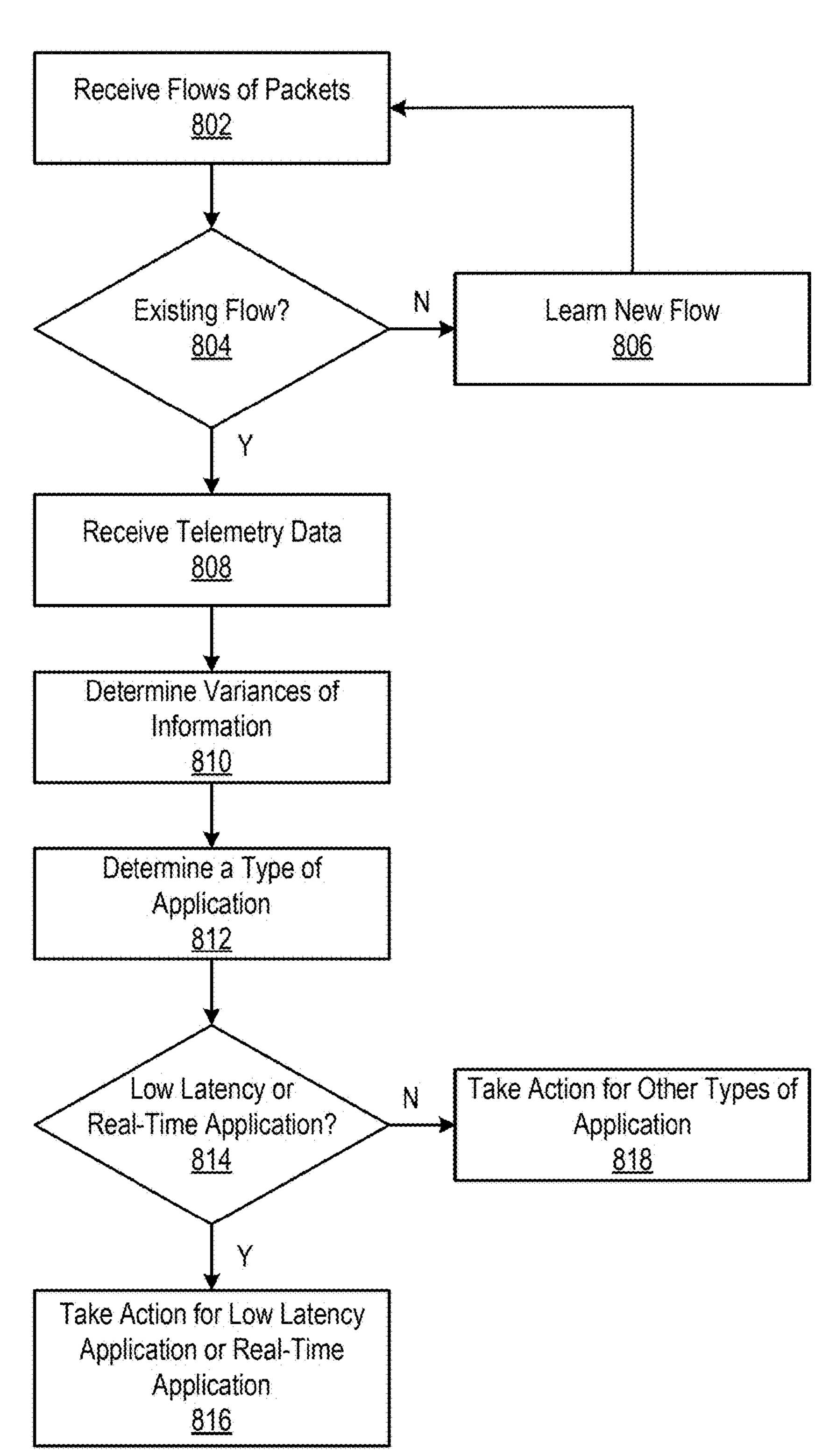
FIG. 8 is an example flow diagram of a method for profiling low latency applications using telemetry, in accordance with one or more implementations.

FIG. 8 illustrates an example flow diagram of a method 800 for profiling low latency applications using telemetry. The example method 800 can be executed, performed, or otherwise carried out by one or more components of the system 300 (e.g., data processing system 306, network 301, client device(s) 303, server(s) 304, or cloud 305), one or more components of the communication system 100, the computer 2001, one or more components of the computing environment 2060, or any other computing devices described herein in conjunction with FIGS. 1A-2B. The method 800 can include receiving, by a data processing system (e.g., data processing system 306), flows of packets, at ACT 802. At ACT 804, the data processing system can determine whether the individual the flow of packets is associated with an existing flow. At ACT 806, the data processing system can learn a new flow. At ACT 808, the data processing system can receive telemetry data. At ACT 810, the data processing system can determine variances of information. At ACT 812, the data processing system can determine a type of application. At ACT 814, the data processing system can determine whether each flow of packets is for a low latency or real-time application. At ACT 816, the data processing system can take one or more actions for the low latency application or real-time application. At ACT 818, the data processing system can take one or more actions for other types of applications.

Still referring to FIG. 8 in further detail, at ACT 802, the data processing system (e.g., data collector 310) can receive flows of packets from at least one network device, such as a client device (e.g., client device 302), an ISP (e.g., ISP 303), a server (e.g., server 304), or a cloud (e.g., cloud 305). The flows of packets can be from or for at least one application executed by the network device. For purposes of providing examples, the analysis for detecting the type of application can be performed for at least one flow of a plurality of packets.

In some implementations, the data processing system may determine whether the flows of packets are eligible for telemetry collection. For example, the data processing system can identify information included in individual packets. The data processing system can be configured to collect telemetry data for flows of packets that include certain types of information, such as source IP address or destination IP address. The data processing system can filter one or more flows of packets that lack the configured types of information. The data processing system can determine to collect telemetry data for flows of packets with the configured types of information. In some cases, the data processing system may collect the telemetry data for any flow.

At ACT 804, the data processing system can determine whether the one or more flows of packets are associated with at least one existing flow. For example, the data processing system can obtain the 5-tuple from individual packets. The data processing system can compare the 5-tuple to entries within the database (e.g., data repository 322). Each entry can include a respective 5-tuple of a corresponding existing flow. If the 5-tuple of the packets associated with a flow matches at least one of the entries, the data processing system can determine that the packets belong to an existing flow. In this case, the data processing system can proceed to ACT 808. Otherwise, if the 5-tuple of the packets associated with the flow does not match any of the entries, the data processing system can proceed to ACT 806, as the flow of packets is a new flow (not an existing flow).

At ACT 806, the data processing system can learn the new flow. Learning the new flow can include adding the 5-tuple associated with the new flow in the database as part of a new entry. The new entry can include or be associated with one or more counters used to obtain telemetry data for the flow. As part of learning the new flow, the data processing system can update the one or more counters of the new flow or variables for generating the telemetry data with information associated with the packets, such as the bandwidth, packet length, or the arrival time of the packet, etc. The data processing system can return to ACT 802 to receive one or more other packets of the flow (or of a different flow).

At ACT 808, the data processing system (e.g., telemetry manager 312) can receive, obtain, or generate the telemetry data. The data processing system can receive the telemetry data for individual flows of packets. The telemetry data can be received on a periodic basis (e.g., at predefined intervals or periods). For example, responsive to receiving each packet for the flow, the data processing system can update the counters for individual telemetry data, such as counters for bandwidth, average packet length, or average IAT. The data processing system can iteratively update the counters with each new packet for the flow. The data processing system can export the counters periodically (e.g., every T seconds) to generate the corresponding telemetry data.

At ACT 810, the data processing system (e.g., variance generator 314) can determine variances of information using the telemetry data. The variances of information can include at least one of, but not limited to, a variance of bandwidth, a variance of packet lengths, or a variance of inter-arrival times between packets for each of the plurality of flows of packets. The data processing system can compute or determine at least one of the variances on the periodic basis. Determining the variances on the periodic basis may involve the data processing system updating the variances using new telemetry data collected periodically. The data processing system can track the changes in at least one of the variances over time, for instance, as at least one of the variance of bandwidth, the variance of packet lengths, or the variance of inter-arrival times changes over time according to newly received or collected telemetry data.

At ACT 812, the data processing system (e.g., application detector 318) can determine a type of application for the flow of the plurality of flows of packets based at least on a signature of at least one of the variance of bandwidth, the variance of packet lengths, or the variance of inter-arrival times for the flow, among other variances. For example, the data processing system can compare the one or more variances to a predetermined threshold (e.g., standard deviation of 1%, 2%, 5%, or other predetermined values). The result of the comparison can be indicative of whether the flow is a latency-sensitive flow or a latency-insensitive flow. In another example, the data processing system can use a model trained using machine learning (e.g., by the model manager 316) to compare the signature of the flow (e.g., values of the variances or telemetry data) to historical signatures of known applications. The data processing system can determine, using the model, whether there is a matching historical signature for the signature of the flow. Any match can be indicative of whether the flow is a latency-sensitive flow (of a low latency application) or latency-insensitive flow (or other types of applications).

At ACT 814, the data processing system can determine whether each flow of packets is for a low latency application (or a real-time application) or other types of applications. For example, the data processing system can determine the type of application for the flow of packets is the low latency application based on at least one of the variance of bandwidth, the variance of packet lengths, or the variance of inter-arrival times for the flow being within (e.g., at or below) the predefined threshold. The data processing system can determine that the flow of packets is for other types of applications based on at least one of the variance of bandwidth, the variance of packet lengths, or the variance of inter-arrival times for the flow being outside (e.g., above) the predefined threshold. In some cases, the data processing system may determine that the flow of packets is for the low latency application based on all of the variances (e.g., the variance of bandwidth, the variance of packet lengths, and the variance of inter-arrival times) being within the predefined threshold. The data processing system can proceed to ACT 816 in response to detecting or determining that the flow is for the low latency application or to ACT 818 in response to detecting that the flow is for other types of applications.

In some implementations, the data processing system can determine whether the signature of the flow matches the historical signature of known applications using the model. The signature can include or refer to values of the variances (e.g., signature determined as a function of the variance of bandwidth, the variance of packet lengths, and the variance of inter-arrival times) or telemetry data. In scenarios when a match between signatures is identified, using the model, the data processing system can obtain an indication of the type of application (e.g., low latency or other types of applications) associated with the matched historical signature for a known application. Similarly to the above, the data processing system can proceed to ACT 816 to take action for latency-sensitive flows or to ACT 818 for latency-insensitive flows. In scenarios when the signature is not matched with any of the historical signatures for known applications, the data processing system can proceed to ACT 818, as the signature of the flow does not represent a signature of the latency-sensitive flow.

In some implementations, the data processing system can compute the average of each of the bandwidth, packet lengths, and inter-arrival times (or other telemetry data) over a plurality of time intervals. The averages of the telemetry data can correspond to or be a part of the signature of the telemetry data. In this case, the data processing system may determine the signature as a function of the average of each of the telemetry data. The data processing system may train the model with a historical average of each of the historical telemetry data, for example. The data processing system can match the signature determined as a function of the averages to at least one historical signature indicative of a known application, for instance, to determine the type of application for the flow.

At ACT 816, the data processing system can take one or more actions for the low latency application or real-time application. For example, the data processing system (e.g., action manager 320) can take one or more actions to provide a quality of service for the flow according to the type of application in response to determining the type of application. For the flow of the low latency application or real-time application, the data processing system can assign the flow to a link in a link-aggregation as a destination port. In some cases, the data processing system may assign the flow (e.g., latency-sensitive flow) to a higher traffic class. In some cases, the data processing system can store the packets from the flow to one or more higher-priority queues. In some other cases, the data processing system can use a network traffic shaper to reduce burstiness. In some configurations, the data processing system may take multiple or a combination of actions for the type of application. In some implementations, the data processing system can send instructions to at least one other network device to take the one or more actions for the type of application.

At ACT 818, the data processing system can take one or more actions for other types of applications. In this case, the one or more actions for other types of applications (e.g., non-latency sensitive applications) can include at least using traffic management of buffer policies for the one or more latency-insensitive flows. In some cases, the data processing system may store the packets from the latency-insensitive flow to one or more lower-priority queues. In some other cases, the data processing system may assign the latency-insensitive flow to a lower traffic class.

In some implementations, the type of application can include separate flows for each of voice, video, management, control, and data. In such cases, each of the flows can be handled separately, such that each flow of the same application may be associated with different types of flows (e.g., latency-sensitive flow or latency-insensitive flow). In this case, the data processing system can take different actions for the different flows of the same application, for example. It should be noted that other actions can be performed for different types of flows or applications not limited to those discussed herein.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure. The headings provided in this document are non-limiting.

The applications and servers have been described above with the aid of functional building blocks illustrating the performance of certain significant functions. The boundaries of these functional building blocks have been arbitrarily defined for convenience of description. Functions and structures can be integrated together across such boundaries. Alternate boundaries could be defined as long as the certain significant functions are appropriately performed. Similarly, flow diagram blocks may also have been arbitrarily defined herein to illustrate certain significant functionality. To the extent used, the flow boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprising:

receiving, by a data processing system comprising one or more processors and memory, telemetry data for a plurality of flows of packets;

determining, by the data processing system using variability of data points of the telemetry data, a variance of bandwidth, a variance of packet lengths, and a variance of inter- arrival times between packets for each of the plurality of flows of packets;

generating, by the data processing system based at least on the variability of the data points of the telemetry data, a signature of a flow of packets of the plurality of flows of packets, the signature comprising a function computed using each of the variance of bandwidth, the variance of packet lengths, and the variance of inter-arrival times for the flow of packets;

comparing, by the data processing system, the signature of the flow of packets to a plurality of signatures of applications that are profiled;

determining, by the data processing system based at least on the signature matching at least one of the plurality of signatures that comprises one or more variances of telemetry data that are at or below a variance threshold, a type of application for the flow of packets that supports maintaining a time interval between transmission and reception of packets for the flow of packets within a time threshold; and taking, by the data processing system responsive to determining the type of application, one or more actions to provide a quality of service for the flow of packets according to the type of application.

2. The method of claim 1, further comprising determining, by the data processing system, the type of application is one of a low latency application or a real-time application.

3. The method of claim 1, further comprising receiving, by the data processing system, the telemetry data on a periodic basis.

4. The method of claim 3, further comprising determining, by the data processing system on the periodic basis, the variance of bandwidth, the variance of packet lengths, and the variance of inter-arrival times between packets for each of the plurality of flows of packets.

5. The method of claim 4, further comprising tracking, by the data processing system, changes in the variance of bandwidth, the variance of packet lengths, and the variance of inter-arrival times over time.

6. The method of claim 1, further comprising determining, by the data processing system, the type of application for the flow of packets based on the variance of bandwidth, the variance of packet lengths, and the variance of inter-arrival times for the flow of packets being within a threshold.

7. The method of claim 1, further comprising determining, by the data processing system, the type of application for the flow of packets based at least on an average of each of bandwidth, packet lengths, and inter-arrival times.

8. The method of claim 1, wherein taking the one or more actions comprises one or more of:

assigning, by the data processing system, the flow to a link in a link-aggregation as a destination port;

assigning, by the data processing system, the flow to a higher traffic class;

storing, by the data processing system, packets from the flow to one or more higher priority queues;

using, by the data processing system, a network traffic shaper to reduce burstiness; and using, by the data processing system, traffic management or buffer policies for one or more other flows.

9. The method of claim 1, wherein the type of application comprises separate flows for each of voice, video, management, control, and data.

10. A system comprising:

a data processing system comprising one or more processors and memory, configured to:

determine, using variability of data points of telemetry data received for a plurality of flows of packets, a variance of bandwidth, a variance of packet lengths, and a variance of inter-arrival times between packets for each of the plurality of flows of packets;

generate, based at least on the variability of the data points of the telemetry data, a signature of a flow of packets of the plurality of flows of packets, the signature comprising a function computed using each of the variance of bandwidth, the variance of packet lengths, and the variance of inter-arrival times for the flow of packets;

compare the signature of the flow of packets to a plurality of signatures of applications that are profiled;

determine, based at least on the signature matching at least one of the plurality of signatures that comprises one or more variances of telemetry data that are at or below a variance threshold, a type of application for the flow of packets that supports maintaining a time interval between transmission and reception of packets for the flow of packets within a time threshold; and take, in response to determining the type of application, one or more actions to provide a quality of service for the flow of packets according to the type of application.

11. The system of claim 10, wherein the data processing system is further configured to determine the type of application for the flow of packets based on the function of the variance of bandwidth, the variance of packet lengths, and the variance of inter-arrival times for the flow of packets being within a threshold.

12. The system of claim 10, wherein the data processing system is further configured to determine the type of application for the flow of packets based at least on an average of inter-arrival times.

13. The system of claim 10, wherein the data processing system is further configured to determine to take, responsive to the type of application, the one or more actions comprising one or more of:

assigning the flow a link in a link-aggregation as a destination port;

assigning the flow to a higher traffic class;

storing packets from the flow to one or more higher priority queues;

using a network traffic shaper to reduce burstiness; and using traffic management or buffer policies for one or more other flows.

14. A system comprising:

a network device intermediary to a plurality of devices communicating, via the network device, a plurality of flows of packets for one or more applications, the network device configured to:

determine, using variability of data points of telemetry data for the plurality of flows of packets, a variance of bandwidth, a variance of packet lengths, and a variance of inter-arrival times between packets for each of the plurality of flows of packets;

generate, based at least on the variability of the data points of the telemetry data, a signature of a flow of packets of the plurality of flows of packets, the signature comprising a function computed using each of the variance of bandwidth, the variance of packet lengths, and the variance of inter-arrival times for the flow of packets;

compare the signature of the flow of packets to a plurality of signatures of applications that are profiled;

determine, based at least on the signature matching at least one of the plurality of signatures that comprises one or more variances of telemetry data that are at or below a variance threshold, a type of application for the flow of packets that supports maintaining a time interval between transmission and reception of packets for the flow of packets within a time threshold; and take, in response to determining the type of application, one or more actions to provide a quality of service for the flow of packets according to the type of application.

15. The system of claim 14, wherein the network device comprises a switch.

* * * * *